United States Patent
Li et al.

(10) Patent No.: US 12,542,749 B2
(45) Date of Patent: Feb. 3, 2026

(54) SERVICE PROTECTION METHOD AND NETWORK NODE

(71) Applicant: Huawei Technologies Co., Ltd., Shenzhen (CN)

(72) Inventors: Hao Li, Wuhan (CN); Gang Xie, Wuhan (CN); Timing Fu, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 3 days.

(21) Appl. No.: 18/471,688

(22) Filed: Sep. 21, 2023

(65) Prior Publication Data

US 2024/0064111 A1  Feb. 22, 2024

Related U.S. Application Data

(63) Continuation of application No. PCT/CN2022/076213, filed on Feb. 14, 2022.

(30) Foreign Application Priority Data

Mar. 24, 2021  (CN) ................... 202110317426.X

(51) Int. Cl.
  *H04L 47/74* (2022.01)
  *H04B 10/03* (2013.01)
  *H04L 45/00* (2022.01)

(52) U.S. Cl.
  CPC .......... *H04L 47/746* (2013.01); *H04B 10/03* (2013.01); *H04L 45/22* (2013.01)

(58) Field of Classification Search
  CPC ........ H04L 47/746; H04L 45/22; H04B 10/03
  See application file for complete search history.

(56) References Cited

U.S. PATENT DOCUMENTS

| | | | |
|---|---|---|---|
| 7,451,340 B2 | 11/2008 | Doshi et al. | |
| 2009/0238196 A1* | 9/2009 | Ukita | H04L 45/00 370/408 |
| 2013/0128725 A1* | 5/2013 | Maggiari | H04L 41/0668 370/225 |
| 2014/0233373 A1* | 8/2014 | O'Connor | H04L 41/0663 370/228 |
| 2016/0315696 A1* | 10/2016 | Lee | H04B 10/032 |

FOREIGN PATENT DOCUMENTS

WO  2007047867 A2  4/2007

OTHER PUBLICATIONS

Awduche, A., et al., "RSVP-TE: Extensions to RSVP for LSP Tunnels," Network Working Group, RFC 3209, Dec. 2001, 61 pages.

* cited by examiner

*Primary Examiner* — Emmanuel L Moise
*Assistant Examiner* — Xiang Yu
(74) *Attorney, Agent, or Firm* — Conley Rose, P.C.

(57) ABSTRACT

A service protection method includes a first node that determines that a fault has occurred on a first working path, and generates a service switching message based on the fault on the first working path. The first node sends the service switching message on a first protection path, where the service switching message indicates to adjust a bandwidth of a service from a guard bandwidth to a target bandwidth, where the guard bandwidth represents a pre-occupied bandwidth of the first protection path before the service is transmitted, where the target bandwidth represents an occupied bandwidth for transmitting the service on the first protection path, and where the guard bandwidth is less than the target bandwidth.

20 Claims, 11 Drawing Sheets

FAS: Frame alignment signal   OTUk: Optical transport unit k
OH: Overhead                   ODUk: Optical data unit k
OPUk: Optical payload unit k   FEC: Forward error correction

```
  0                   1                   2                   3
  0 1 2 3 4 5 6 7 8 9 0 1 2 3 4 5 6 7 8 9 0 1 2 3 4 5 6 7 8 9 0 1
 +-+-+-+-+-+-+-+-+-+-+-+-+-+-+-+-+-+-+-+-+-+-+-+-+-+-+-+-+-+-+-+-+
 |    Length     | Message_Type  |Ver |           Resv           |
 +-+-+-+-+-+-+-+-+-+-+-+-+-+-+-+-+-+-+-+-+-+-+-+-+-+-+-+-+-+-+-+-+
 |                          Service_Id                           |
 +-+-+-+-+-+-+-+-+-+-+-+-+-+-+-+-+-+-+-+-+-+-+-+-+-+-+-+-+-+-+-+-+
 |                           Bandwidth                           |
 +-+-+-+-+-+-+-+-+-+-+-+-+-+-+-+-+-+-+-+-+-+-+-+-+-+-+-+-+-+-+-+-+
 |           APS Type            |              APS              |
 +-+-+-+-+-+-+-+-+-+-+-+-+-+-+-+-+-+-+-+-+-+-+-+-+-+-+-+-+-+-+-+-+
 |                              Resv                             |
 +-+-+-+-+-+-+-+-+-+-+-+-+-+-+-+-+-+-+-+-+-+-+-+-+-+-+-+-+-+-+-+-+
```

SERVICE PROTECTION METHOD AND NETWORK NODE

CROSS-REFERENCE TO RELATED APPLICATIONS

This application is a continuation application of International Patent Application No. PCT/CN2022/076213 filed on Feb. 14, 2022, which claims priority to Chinese Patent Application No. 202110317426.X filed on Mar. 24, 2021. The disclosures of the aforementioned applications are hereby incorporated by reference in their entireties.

TECHNICAL FIELD

The present application relates to the field of optical network technologies, and further, to a service protection method and a network node.

BACKGROUND

With the rapid development of cloud services, large enterprises (such as finance enterprises) and small and medium enterprises (such as hospitals and internet cafes) are demanding to use a cloud system to reduce enterprise operation and maintenance costs. Cloudification of enterprise applications is gradually performed, and a multi-cloud strategy and a multi-cloud service are becoming a trend. In a scenario in which an enterprise accesses a cloud, an operator expects that planned decoupling can be performed on an Internet Protocol (IP) address on an enterprise side and an IP address on a cloud server side, so that a plurality of clouds can be accessed through flexible scheduling. If an optical transport network (OTN) can support an IP service in being directly carried over an OTN trail, the foregoing requirement can be met. FIG. 1 shows a typical application scenario, that is, a process in which a metropolitan area enterprise accesses a provincial cloud pool. In enterprise cloud dedicated access service networking, an enterprise service accesses a cloud server based on a local IP. As shown in FIG. 1, customer equipment of the enterprise sends service access of the enterprise to customer-premises equipment (CPE) by using the local IP, and then the service access may directly arrive at cloud premise equipment (PE) through an OTN trail between the CPE and the cloud PE, implementing one-hop direct arrival at the trail from the CPE to the cloud PE. The cloud PE sends the service access to a cloud point-of-presence (POP) node (the provincial cloud pool) by using the local IP, to obtain data related to the service access from a cloud access point (e.g., POP). Since a service can be directly transmitted through the OTN trail between the CPE and the cloud PE, services of different enterprises can be hard isolated during transmission on a public network. This ensures high quality and security.

With the development of the OTN, OTN protection and restoration become important concerns in operations such as design, operation, and maintenance of a current optical transport network. Efficient and flexible protection and restoration methods become an important feature of the optical transport network.

An automatically switched optical network (ASON) is an optical network that is defined by the International Telecommunication Union (ITU) and that is based on a distributed control plane and supports a dynamic switching connection. The ASON has basically covered wavelength division multiplexing networks such as a metropolitan area network and a core backbone network. In the ASON, each ASON node uses an Open Shortest Path First (OSPF) protocol to obtain information, including node data, link data, and the like, about another node in an entire network, then uses a constrained shortest path first (CSPF) algorithm to compute an end-to-end service path, and finally establishes an end-to-end service path through Resource Reservation Protocol (RSVP)-traffic engineering (TE). After an optical fiber of the network is broken, an end-to-end restoration path may be automatically established through Generalized Multi-Protocol Label Switching (GMPLS) and RSVP-TE, to provide real-time rerouting protection and restoration capabilities for a service.

For the metropolitan area network/core ASON, real-time rerouting restoration can be performed only after an optical fiber fault occurs in the network. A restoration speed is slow, and restoration time is at a 100 millisecond (ms) scale, for example, 200 ms. Alternatively, a 1+1 dedicated protection group may be configured to implement fast service switching after a fault occurs in the network. That is, primary/secondary 1+1 service paths are configured to quickly ensure restoration of a service. However, dedicated 1+1 protection has high costs and requires twice a resource. In addition, these service restoration methods are mainly used for a layer 1 (L1) service. How to quickly restore a layer 3 (L3) service with low resource costs is still in a blank phase.

SUMMARY

To implement restoration of an L3 service and reduce resource occupation costs, this application provides a service protection method and a network node.

According to a first aspect, an embodiment of this application provides a service protection method. The method is applied to a communication system. The communication system includes a first node, a second node, a third node, and a fourth node. The first node is a common head node of a first working path and a first protection path. The second node is a sink node of the first working path. The third node is a sink node of the first protection path. The fourth node is any node other than the first node and the third node on the first protection path. The first working path is a current communication path of a service. The first protection path is a backup path of the first working path. The service is an L3 service. The method includes the following. The first node determines that a fault occurs on the first working path, and generates a service switching message based on that a fault occurs on the first working path. The first node sends the service switching message on the first protection path. The service switching message indicates to adjust a bandwidth of the service from a guard bandwidth to a target bandwidth. The guard bandwidth represents a pre-occupied bandwidth of the first protection path before the service is transmitted, and the target bandwidth represents an actually occupied bandwidth for transmitting the service on the first protection path. The guard bandwidth is less than the target bandwidth. The first node switches a current working route to a working route corresponding to the first protection path.

It can be learned that, based on the service protection method provided in this embodiment of this application, a virtual connection of the first protection path is first established by using the guard bandwidth before a fault occurs in the service. Because the established virtual connection occupies relatively few bandwidth resources, when the fault occurs in the service, the head node of the service may send the service switching message to a downstream node along the first protection path, and an intermediate node on the first protection path may adjust the bandwidth of the service from the guard bandwidth to the target bandwidth based on the service switching message. The head node and the last node further switch the working route based on the service switching message while performing bandwidth adjustment, to restore the L3 service in a source end-to-sink end manner.

With reference to the first aspect, in some possible implementations, that the first node switches a working route to a route corresponding to the first protection path includes the following. The first node determines a first routing protection group based on the first protection path and a correspondence between a path and a routing protection group, where the correspondence between a path and a routing protection group is preconfigured on the first node, the first routing protection group includes a primary route and a secondary route, the primary route is a route used when the first node transmits the L3 service on the first working path, and the secondary route is a route used when the first node transmits the L3 service on the first protection path. The first node switches the working route from the primary route to the secondary route.

It can be learned that, in this implementation, the correspondence between a path and a routing protection group is preconfigured on the head node and the last node of the service. In this way, when an L3 fault occurs, the head node and the last node of the service can determine a routing protection group of the first protection path based on channel associated signaling, to complete switching of the working route, thereby restoring the L3 service in an end-to-end manner.

With reference to the first aspect, in some possible implementations, when the second node and the third node are a same node, the service switching message further indicates the second node or the third node to switch the working route.

It can be learned that, in this implementation, when the second node and the third node are the same node, that is, the second node and the third node are real sink nodes that transmit the service, the head node of the service may further indicate, by using the service switching message, the last node of the service to switch the working route, to further restore the L3 service in an end-to-end manner.

With reference to the first aspect, in some possible implementations, the service switching message includes an automatic protection switching (APS) type message. The APS type message indicates the second node or the third node to switch the working route.

With reference to the first aspect, in some possible implementations, that the first node sends the service switching message on the first protection path includes the following. The first node inserts the service switching message into a payload area of a first data frame. The first node sends the first data frame on the first protection path.

It can be learned that, in this implementation, the service switching message is inserted into the payload area instead of an overhead area in the first data frame. A field in the payload area may be customized. In this way, each node can obtain the service switching message from the first data frame provided that a meaning of an added field is defined in the node. This reduces costs of obtaining the service switching message by the node, and accelerates service restoration.

With reference to the first aspect, in some possible implementations, the payload area of the first data frame includes a plurality of optical service units, and each of the plurality of optical service units includes a unit overhead area and a unit payload area. That the first node sends the service switching message on the first protection path includes the following. The first node inserts the service switching message into the unit payload area of one or more of the optical service units. The first node sends the first data frame on the first protection path.

It can be learned that, in an implementation, when information is carried by using a flexible optical service unit, the service switching message may be located in a same optical service unit, or may be located in different optical service units. Therefore, a manner of carrying the service switching message is relatively flexible.

With reference to the first aspect, in some possible implementations, after the first node sends the service switching message on the first protection path, the method further includes the following. The first node adjusts the bandwidth of the service from the guard bandwidth to the target bandwidth. The first node switches the service to the first protection path.

It should be noted that, the reason why the service switching message is first sent to the downstream node and then protection switching is performed is to transmit the service switching message to nodes on the protection path as soon as possible. A plurality of nodes may adjust bandwidth concurrently, and the sink node may switch the working route, to implement the protection switching of the service as soon as possible.

With reference to the first aspect, in some possible implementations, after the first node determines that a fault occurs on the first working path, the method further includes the following. The first node obtains a service identifier (ID) of the service. The first node determines the first protection path based on the service ID.

A preset condition of the foregoing implementation is that the first node already stores a correspondence between the service ID and a first protection path service ID in the node. It should be further noted that, the first protection path service ID may be used as follows. When a remaining bandwidth of the downstream node is less than the target bandwidth of the service, whether another service shares a bandwidth of a current node with the existing service may be determined based on the first protection path service ID, and then whether to perform bandwidth adjustment is determined based on a determining result, to implement bandwidth sharing.

According to a second aspect, an embodiment of this application provides a service protection method. The method is applied to a communication system. The communication system includes a first node, a second node, a third node, and a fourth node. The first node is a common head node of a first working path and a first protection path. The second node is a sink node of the first working path. The third node is a sink node of the first protection path. The fourth node is any node other than the first node and the third node on the first protection path. The first working path is a current communication path of a service. The first protection path is a backup path of the first working path. The service is an L3 service. The method includes the following. The third node receives a first data frame on the first protection path. The third node obtains a service switching message from the first data frame. The service switching message indicates the third node to adjust a bandwidth of the service from a guard bandwidth to a target bandwidth. The guard bandwidth represents a pre-occupied bandwidth of the first protection path before the service is transmitted, and the target bandwidth represents an actually occupied bandwidth for transmitting the service on the first protection path. The guard bandwidth is less than the target bandwidth. The third node adjusts the bandwidth of the service from the guard bandwidth to the target bandwidth based on the service switching message.

It can be learned that, based on the service protection method provided in this embodiment of this application, after the fault occurs on the working path of the service, the service switching protection message is inserted into the payload area of the data frame, so that costs of extraction by the node can be reduced, and fast service restoration can be implemented. In addition, before the fault occurs in the service, the first protection path is a virtual connection, and occupies few bandwidth resources. After the fault occurs in the service, when the third node is an intermediate node on the protection path, the third node adjusts the bandwidth of the service from the guard bandwidth to the target bandwidth based on the service switching message, to implement switching of the L3 service.

With reference to the second aspect, in some possible implementations, when the second node and the third node are a same node, the service switching message further indicates the second node or the third node to switch a working route. Before the third node adjusts the bandwidth of the service from the guard bandwidth to the target bandwidth based on the service switching message, the method includes the following. The third node determines a first routing protection group based on the first protection path and a correspondence between a path and a routing protection group, where the correspondence between a path and a routing protection group is preconfigured on the third node, the first routing protection group includes a primary route and a secondary route, the primary route is a route used for transmitting an L3 service on the first working path, and the secondary route is a route used for transmitting the L3 service on the first protection path. The third node switches the working route from the primary route to the secondary route.

It can be learned that, in this implementation, the correspondence between a path and a routing protection group is preconfigured on the head node and the last node of the service. In this way, when the second node and the third node are the same node, that is, when the third node is an actual last node for transmitting the service, the third node may further switch the working route based on the service switching message, to transmit the service switching message on a layer L1 path, and complete switching of the L3 service.

With reference to the second aspect, in some possible implementations, the service switching message includes an APS type message, and the APS type message indicates the second node or the third node to switch the working route.

With reference to the second aspect, in some possible implementations, the service switching message is carried in the payload area of the first data frame.

It can be learned that, in this implementation, the service switching message is inserted into the payload area instead of an overhead area in the first data frame, so that costs of obtaining the service switching message by the node can be reduced, thereby accelerating service restoration.

With reference to the second aspect, in some possible implementations, the payload area of the first data frame includes a plurality of optical service units, each of the plurality of optical service units includes a unit overhead area and a unit payload area, and the service switching message is carried in the unit payload area of one or more of the optical service units.

It can be learned that, in an implementation, when information is carried by using a flexible optical service unit, the service switching message may be located in a same optical service unit, or may be located in different optical service units. Therefore, a manner of carrying the service switching message is relatively flexible.

According to a third aspect, an embodiment of this application provides a service protection method. The method is applied to a communication system. The communication system includes a first node, a second node, a third node, and a fourth node. The first node is a common head node of a first working path and a first protection path. The second node is a sink node of the first working path. The third node is a sink node of the first protection path. The fourth node is any node other than the first node and the third node on the first protection path. The first working path is a current communication path of a service. The first protection path is a backup path of the first working path. The service is an L3 service. The method includes the following. The fourth node receives a first data frame on the first protection path. The fourth node obtains a service switching message from the first data frame. The service switching message indicates the fourth node to adjust a bandwidth of the service from a guard bandwidth to a target bandwidth. The guard bandwidth represents a pre-occupied bandwidth of the first protection path before the service is transmitted, and the target bandwidth represents an actually occupied bandwidth for transmitting the service on the first protection path. The guard bandwidth is less than the target bandwidth. The fourth node adjusts the bandwidth of the service from the guard bandwidth to the target bandwidth based on the service switching message.

It can be learned that, based on the service protection method provided in this embodiment of this application, after the fault occurs on the working path of the service, the service switching protection message is inserted into the payload area of the data frame, so that costs of extraction by the node can be reduced, and fast service restoration can be implemented. In addition, before the fault occurs in the service, the first protection path is a virtual connection, and occupies few bandwidth resources. After the fault occurs in the service, when the third node is an intermediate node on the protection path, the third node adjusts the bandwidth of the service from the guard bandwidth to the target bandwidth based on the service switching message, to implement switching of the L3 service.

With reference to the third aspect, in some possible implementations, the service switching message is carried in the payload area of the first data frame.

It can be learned that, in this implementation, the service switching message is inserted into the payload area instead of an overhead area in the first data frame, so that costs of obtaining the service switching message by the node can be reduced, thereby accelerating service restoration.

With reference to the third aspect, in some possible implementations, the payload area of the first data frame includes a plurality of optical service units, each of the plurality of optical service units includes a unit overhead area and a unit payload area, and the service switching message is carried in the unit payload area of one or more of the optical service units.

It can be learned that, in an implementation, when information is carried by using a flexible optical service unit, the service switching message may be located in a same optical service unit, or may be located in different optical service units. Therefore, a manner of carrying the service switching message is relatively flexible.

According to a fourth aspect, an embodiment of this application provides a network node, including a processing unit configured to determine that a fault occurs on a first working path, and generate a service switching message based on that a fault occurs on the first working path, and a transceiver unit configured to send the service switching message on a first protection path, where the service switching message indicates to adjust a bandwidth of a service from a guard bandwidth to a target bandwidth, the guard bandwidth represents a pre-occupied bandwidth of the first protection path before the service is transmitted, and the target bandwidth represents an actually occupied bandwidth for transmitting the service on the first protection path, where the guard bandwidth is less than the target bandwidth. The processing unit is further configured to switch a current working route to a working route corresponding to the first protection path.

With reference to the fourth aspect, in some possible implementations, in terms of switching, by the first node, the working route to the route corresponding to the first protection path, the processing unit is further configured to determine a first routing protection group based on the first protection path and a correspondence between a path and a routing protection group, where the first routing protection group includes a primary route and a backup route, the correspondence between a path and a routing protection group is preconfigured on the first node, the primary route is a route used when the first node transmits the L3 service on the first working path, and the secondary route is a route used when the first node transmits the L3 service on the first protection path, and switch the working route from the primary route to the secondary route.

With reference to the fourth aspect, in some possible implementations, when the second node and the third node are a same node, the service switching message further indicates the second node or the third node to switch the working route.

With reference to the fourth aspect, in some possible implementations, the service switching message includes an APS type message, and the APS type message indicates the second node or the third node to switch the working route.

With reference to the fourth aspect, in some possible implementations, in terms of sending the service switching message on the first protection path, the processing unit is further configured to insert the service switching message into a payload area of a first data frame, and send the first data frame on the first protection path.

With reference to the fourth aspect, in some possible implementations, the payload area of the first data frame includes a plurality of optical service units, and each of the plurality of optical service units includes a unit overhead area and a unit payload area. In terms of sending the service switching message on the first protection path, the processing unit is further configured to insert the service switching message into the unit payload area of one or more of the optical service units, and send the first data frame on the first protection path.

With reference to the fourth aspect, in some possible implementations, after determining that the fault occurs on the first working path, the processing unit is further configured to obtain a service ID of the service, and determine the first protection path based on the service ID.

According to a fifth aspect, an embodiment of this application provides a network node, including a transceiver unit configured to receive a first data frame on a first protection path, and a processing unit configured to obtain a service switching message from the first data frame, where the service switching message indicates the network node to adjust a bandwidth of a service from a guard bandwidth to a target bandwidth, the guard bandwidth represents a pre-occupied bandwidth of the first protection path before the service is transmitted, and the target bandwidth represents an actually occupied bandwidth for transmitting the service on the first protection path, where the guard bandwidth is less than the target bandwidth, and adjust the bandwidth of the service from the guard bandwidth to the target bandwidth based on the service switching message.

With reference to the fifth aspect, in some possible implementations, the service switching message further indicates the network node to switch a working route. Before adjusting the bandwidth of the service from the guard bandwidth to the target bandwidth based on the service switching message, the processing unit is further configured to determine a first routing protection group based on the first protection path and a correspondence between a path and a routing protection group, where the correspondence between a path and a routing protection group is preconfigured on the third node, the first routing protection group includes a primary route and a secondary route, the primary route is a route used when an L3 service is transmitted on a first working path, and the secondary route is a route used when the L3 service is transmitted on the first protection path.

With reference to the fifth aspect, in some possible implementations, the service switching message includes an APS type message, and the APS type message indicates the network node to switch the working route.

With reference to the fifth aspect, in some possible implementations, the service switching message is carried in a payload area of the first data frame.

With reference to the fifth aspect, in some possible implementations, the payload area of the first data frame includes a plurality of optical service units, each of the plurality of optical service units includes a unit overhead area and a unit payload area, and the service switching message is carried in the unit payload area of one or more of the optical service units.

According to a sixth aspect, an embodiment of this application provides a network node, including a transceiver unit configured to receive a first data frame on a first protection path, and a processing unit configured to obtain a service switching message from the first data frame, where the service switching message indicates the network node to adjust a bandwidth of a service from a guard bandwidth to a target bandwidth, the guard bandwidth represents a pre-occupied bandwidth of the first protection path before the service is transmitted, and the target bandwidth represents an actually occupied bandwidth for transmitting the service on the first protection path, where the guard bandwidth is less than the target bandwidth, and adjust the bandwidth of the service from the guard bandwidth to the target bandwidth based on the service switching message.

With reference to the sixth aspect, in some possible implementations, the service switching message is carried in a payload area of the first data frame.

With reference to the sixth aspect, in some possible implementations, the payload area of the first data frame includes a plurality of optical service units, each of the plurality of optical service units includes a unit overhead area and a unit payload area, and the service switching message is carried in the unit payload area of one or more of the optical service units.

According to a seventh aspect, this application provides a communication device, including a processor and a memory. The memory is configured to store a computer program or instructions. When the computer program or the instructions is or are executed on the processor, any one of the first aspect or the possible implementations of the first aspect is or are enabled to be performed, any one of the second aspect or the possible implementations of the second aspect is or are enabled to be performed, or any one of the third aspect or the possible implementations thereof is or are enabled to be performed.

According to an eighth aspect, this application provides a computer-readable storage medium. The computer-readable storage medium stores a computer program or instructions. The computer program or the instructions is or are used to implement any one of the first aspect or the possible implementations of the first aspect, implement any one of the second aspect or the possible implementations of the second aspect, or implement any one of the third aspect or the possible implementations thereof.

According to a ninth aspect, this application provides a computer program product, including a computer program. When the computer program is run, a computer is enabled to perform any one of the first aspect or the possible implementations of the first aspect, perform any one of the second aspect or the possible implementations of the second aspect, or perform any one of the third aspect or the possible implementations thereof.

According to a tenth aspect, this application provides a communication system, including the network node in the fourth aspect, the network node in the fifth aspect, and the network node in the sixth aspect.

It can be learned that, in the service protection method provided in the foregoing embodiments, the virtual connection of the shared protection path is established in an end-to-end manner in advance before a fault occurs in the service, and when a fault occurs on the working path of the service, the head node forwards, on the protection path of the layer L1 in an end-to-end manner, an optical service unit (OSU) frame that carries control signaling, and switches a route at the head node and the last node at the L3 through an end-to-end protection switching mechanism of the head node and the last node and in combination with the OSU frame, to switch the L3 service to the protection path, so that the protection path of the service takes effect quickly, thereby quickly restoring the performance of the L3 service. In addition, according to the foregoing methods, the virtual connection of the protection path is established in advance for a plurality of services, and a bandwidth of a protection path section is shared. In this way, on the one hand, a bandwidth resource can be saved, on the other hand, a switching speed can be increased, so that performance of the L3 service can be quickly restored.

DESCRIPTION OF EMBODIMENTS

To facilitate understanding of this application, related technical knowledge in the embodiments of this application is first described herein.

1. Node:

This is used to represent an independent hardware entity in a network and is usually a transport network device. For example, in FIG. 2, there are four nodes, which are respectively a node 1, a node 2, a node 3, and a node 4.

Figure 2:
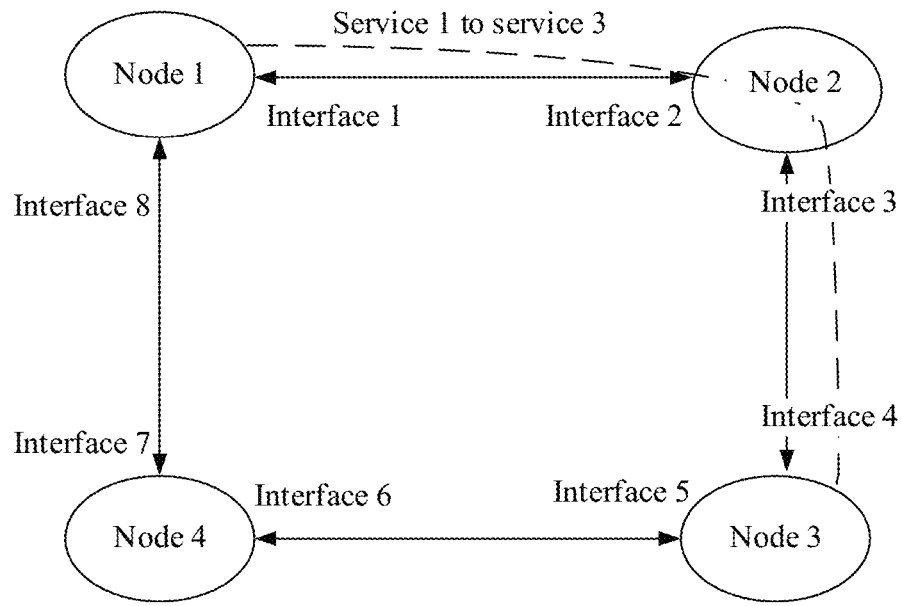
FIG. 2 is a schematic diagram of a network architecture of an ASON according to an embodiment of this application.

It should be understood that an ASON shown in FIG. 2 is merely an example, and does not constitute any limitation on the protection scope of this application. A quantity of nodes included in the ASON may be greater than four, or the quantity of nodes included in the ASON may be greater than or equal to two.

2. Interface:

This is a physical port on a node for sending and receiving a network protocol message and traffic data. For example, in FIG. 2, there are eight interfaces, which are respectively an interface 1, an interface 2, an interface 3, an interface 4, an interface 5, an interface 6, an interface 7, and an interface 8. The interface 1 and the interface 8 are physical ports of the node 1, the interface 2 and the interface 3 are physical ports of the node 2, the interface 4 and the interface 5 are physical ports of the node 3, and the interface 6 and the interface 7 are physical ports of the node 4.

3. Link:

In the embodiments of this application, a connection between two adjacent nodes is referred to as the link. One link may be represented by a link (node-interface). Whether a link exists between two adjacent nodes may indicate whether information such as a network protocol message and/or traffic data can be forwarded between the two adjacent nodes. For example, if the link exists between the two adjacent nodes, the information such as the network protocol message and/or the traffic data can be forwarded between the two adjacent nodes. Similarly, if there is no link between the two adjacent nodes, the information such as the network protocol message and/or the traffic data cannot be forwarded between the two adjacent nodes.

For example, a link (node 1-interface 1, node 2-interface 2) indicates that the information such as the network protocol message and/or the traffic data can be received by the node 2 and on the interface 2 after being sent from the interface 1 of the node 1.

The ASON shown in FIG. 2 has eight links: link 1-2 (node 1-interface 1→node 2-interface 1), link 1-4 (node 1-interface 8-22 node 4-interface 7), link 2-1 (node 2-interface 2→node 1-interface 1), link 2-3 (node 2-interface 3→node 3-interface 4), link 3-2 (node 3-interface 4→node 2-interface 3), link 3-4 (node 3-interface 5→node 4-interface 6), link 4-3 (node 4-interface 6→node 3-interface 5), and link 4-1 (node 4-interface 7→node 1-interface 8).

4. Service:

This indicates that a physical channel connection is established between two nodes, where data traffic can be sent from a head node and received at a sink node. For data traffic of a layer L1 service, the data traffic of the layer L1 service is sent from the head node and is directly transferred to the sink node over a physical channel. For data traffic of an L3 service, the head node carries the data traffic over the physical channel in a routing forwarding manner, and the sink node receives, through a corresponding routing interface, the data traffic of the L3 service carried over the physical channel. For example, the service 1 to the service 3 in FIG. 2 indicate that there is a connectible data channel between the node 1 and the node 3.

Figure 1:
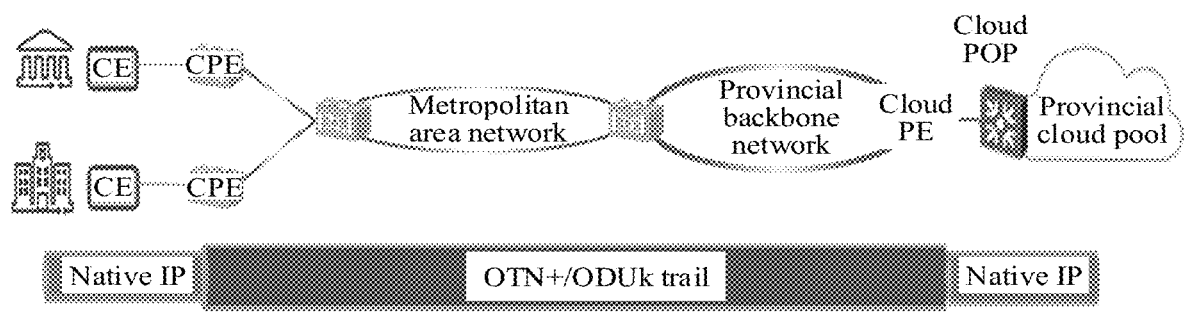
FIG. 1 is a schematic diagram of accessing a provincial cloud pool by a metropolitan enterprise according to an embodiment of this application.

The ASON may provide functions such as fast end-to-end service creation, query, deletion, attribute modification, and restoration by using an RSVP-TE protocol. A network management system delivers a service creation command to a head node network element. Then, the head node network element implements routing computation and initiates a service configuration process by using the RSVP-TE signaling protocol. Cross-connections are established from the head node to downstream nodes in a node-by-node manner. In this way, services are created. This mode makes full use of routing and signaling functions of network elements and shortens service configuration time. As shown in FIG. 1, example steps of establishing an RSVP-TE path for the service 1 to the service 3 are as follows. A head node 1 computes, through CSPF, a service path, that is, node 1-node 2-node 3. The head node carries end-to-end path information, and sends a path message (a type of RSVP-TE protocol packet) to an intermediate node 2 through a specified link interface 1 and a specified link interface 2 along the computed path. After receiving a signaling message, the node 2 obtains, through parsing, cross-configuration correlation information of the current node and establishes a reverse cross-connection. Then, the intermediate node 2 carries the end-to-end path information and sends the path message to a sink node 3 through a specified link interface 2 and a specified link interface 3. Similarly, the sink node 3 obtains, through parsing, the corresponding cross-configuration information and establishes a reverse cross-connection of the current node. The sink node 3 sends an Resv message (a type of RSVP-TE protocol packet) to the head node 1 through the intermediate node 2, and establishes a forward cross connection at each node along the route. In a similar process, the head node 1 sends a path message to a direction of the sink node 3 through the intermediate node 2, and enables alarm monitoring for a service along the way, and the sink node 3 sends an Resv message to a direction of the head node 1 through the intermediate node 2 for acknowledgment. The RSVP-TE signaling automatically completes establishment of end-to-end configuration of the service 1 to the service 3.

In a static network, creation, query, deletion, and attribute modification of a service is manually configured on a single site through the network management system. Consequently, an end-to-end automatic process cannot be implemented. As shown in FIG. 1, if the service 1 to the service 3 are created through the network management system, first, a service path node 1-node 2-node 3 needs to be manually planned, then, single site cross-configuration is performed node by node, after cross-configuration is completed for all nodes, the service 1 to the service 3 are end-to-end created. The entire process requires manual configuration on each single site to create a service. This is inefficient.

5. Service Path:

The service path may include a working path, a restoration path, a protection path, and the like, and is used to carry transmitted service data. The service path is a route from a head node to a sink node. There may be one or more nodes between the head node and the sink node. The head node of the service path represents a sending node of the service data, and the sink node of the service path represents a receiving node of the service data. One service path may be represented by a service (head node-sink node).

Because the service path represents the route from the head node to the sink node, the service path may also be referred to as an end-to-end service path, where "end-to-end" represents "from the head node to the sink node".

In addition, the ASON may provide functions such as end-to-end service path establishment, query, deletion, attribute modification, and restoration by using an RSVP-TE protocol. The end-to-end establishment of the service path includes the following. The network management system delivers a service path establishment command to the head node. Then, the head node implements routing computation and initiates a service path configuration process by using the RSVP-TE signaling protocol. Cross-connections are established from the head node to downstream nodes in a node-by-node manner. In this way, the service path is end-to-end established.

The service path in this application includes both the working path and the protection path. The switching of the service path may indicate that the service is switched from the working path to the protection path, or indicates that the service is switched from the protection path back to the working path again.

6. Flexible Optical Service Unit Frame:

An OTN has become a mainstream technology used in a transport network because it has features such as high bandwidth, large capacity, high reliability, and low latency. The OTN may be applied to backbone, metropolitan core, aggregation, and other networks, and may be further expanded to an access network. A data frame structure used in the OTN is an OTN frame, and the OTN frame may also be referred to as an OTN transmission frame. The OTN frame is used to carry various types of service data and provides various management and monitoring functions. In addition to providing large bandwidth transmission capabilities such as n*1.25 gigabits per second (Gbps) and n*5 Gbps, the OTN needs to provide transmission capabilities as low as several megabits per second in the future.

A liquid OTN introduces, based on a conventional OTN frame structure, a service-oriented flexible container, namely, a flexible optical service unit (OSUflex) frame, and efficiently carries a small-granularity signal through flexible trail bandwidth definition (for example, n*2.4 megabits per second (Mbit/s), where n indicates a quantity of trails). The OSUflex changes an original encapsulation size, and can be directly mapped to a higher order optical channel data unit (ODUk) trail, where k represents a rate level that varies, for example, k=1 represents 2.5 Gbps, and k=4 represents 100 Gbit/s.

Figure 3:
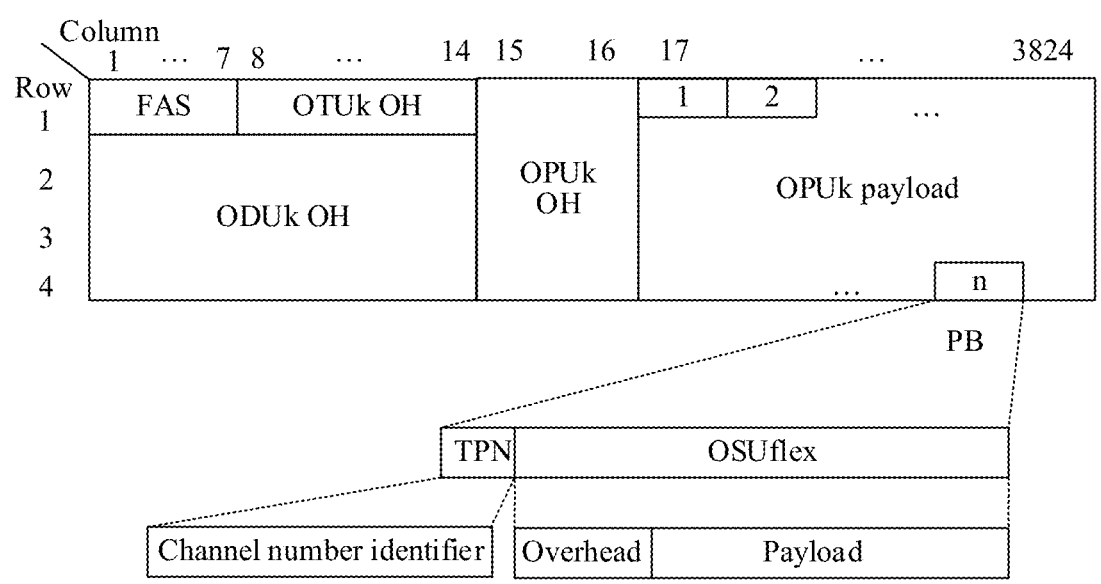
FIG. 3 is a schematic diagram of a structure of an OSU frame according to an embodiment of this application.

In the embodiments of this application, the OTN frame may be the OSUflex frame, and the OSUflex frame may also be briefly referred to as an OSU frame. FIG. 3 is a schematic diagram of a structure of an OSU frame according to an embodiment of this application. As shown in FIG. 3, an optical payload unit-k (OPUk) frame or an OPUflex is divided into a plurality of payload blocks (PBs), and each of the PBs includes an OSU frame and an index number TPN corresponding to the OSU frame. When a plurality of OSU frames is mapped to the OPUk/flex frame, the TPN may be used as a unique channel identifier of the OSU frame at a service layer. Each of the OSU frames includes two parts, namely, an overhead area and a payload area. The overhead area includes but is not limited to overhead information such as a signaling type, a version identifier, and a check bit. The payload area is used to carry service data information. A length of the OSU frame is usually a fixed size, for example, the length is 192 bytes, 240 bytes, 128 bytes, 64 bytes, or the like.

The following further describes the technical solutions in the embodiments of this application with reference to the accompanying drawings in the embodiments of this application. In the descriptions of this application, unless otherwise specified, "/" means or. For example, A/B may represent A or B. In this specification, "and/or" is merely an association relationship for describing associated objects, and indicates that three relationships may exist. For example, A and/or B may indicate the following three cases: only A exists, both A and B exist, and only B exists. In addition, in the description of this application, "a plurality of" means two or more than two unless otherwise specified. In addition, to clearly describe the technical solutions in the embodiments of this application, terms such as "first" and "second" are used in the embodiments of this application to distinguish between same items or similar items that provide basically same functions or purposes. A person skilled in the art may understand that the terms such as "first" and "second" do not limit a quantity or an execution sequence, and the terms such as "first" and "second" do not indicate a definite difference.

A network architecture and a service scenario described in the embodiments of this application are intended to describe the technical solutions in the embodiments of this application more clearly, and do not constitute a limitation on the technical solutions provided in the embodiments of this application. A person of ordinary skill in the art may know that, with the evolution of the network architecture and the emergence of new service scenarios, the technical solutions provided in the embodiments of this application are also applicable to similar technical problems.

Figure 4:
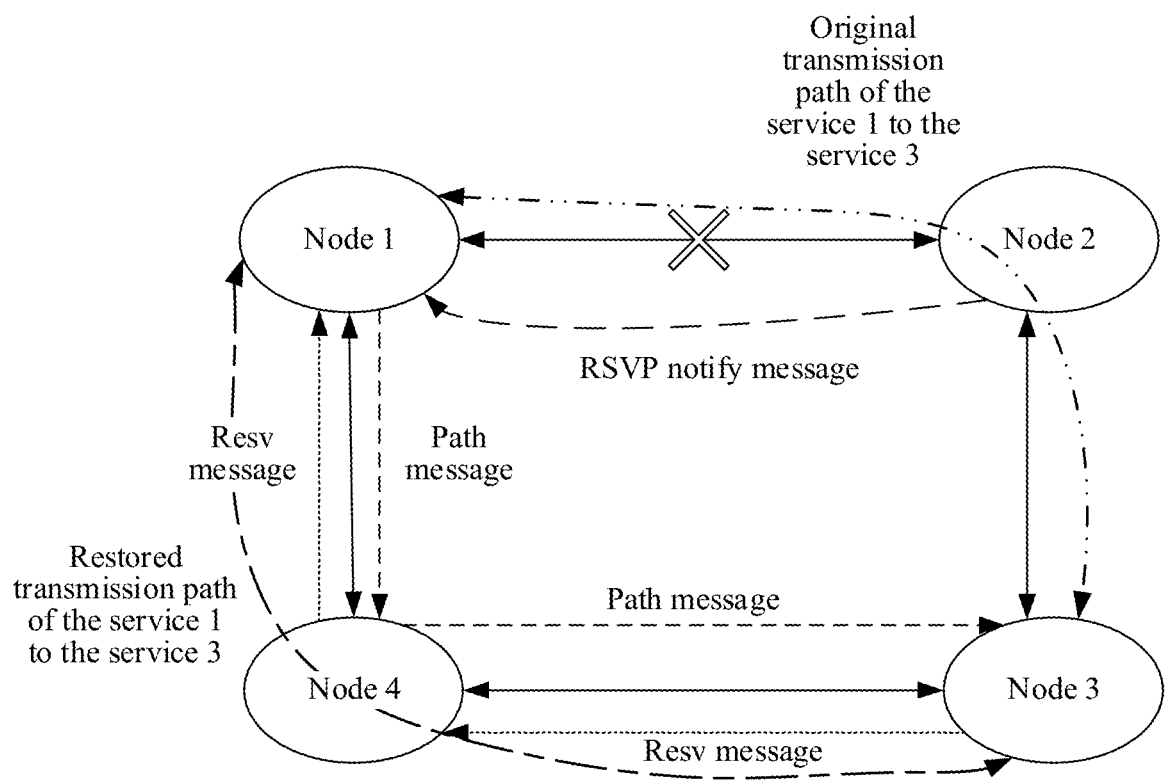
FIG. 4 is a schematic diagram of a service path restoration method according to an embodiment of this application.

FIG. 4 is a schematic diagram of service path restoration. Automatic end-to-end restoration of a service path may be implemented for nodes by using an RSVP-TE protocol.

As shown in FIG. 4, an original service path of a service 1 to a service 3 that is automatically established through RSVP-TE is node 1-node 2-node 3, where the original service path may also be referred to as a working path. If an optical fiber between the node 1 and the node 2 is broken, that automatic end-to-end restoration of a service path is implemented by using an RSVP-TE protocol includes the following.

The node 2 perceives fault alarm information, finds affected services 1 to 3 through matching based on port alarm information carried in the fault alarm information, and then notifies a head node (the node 1) of the affected services 1 to 3 of fault information by using an RSVP notify message.

It should be noted that, in this embodiment of this application, how the node 2 senses the fault alarm information is not limited. It may be that after an optical fiber between the node 1 and the node 2 is broken (where for example, an optical fiber in a direction from the node 1 to the node 2 is broken, but an optical fiber in a direction from the node 2 to the node 1 is not broken), an underlying layer of the node 2 senses the break of the optical fiber (for example, senses interruption of information transmission). In addition, how the node 2 transmits the RSVP notify message to the node 1 is not limited in this embodiment of this application. The transmission may be performed by using the optical fiber in the direction from the node 2 to the node 1. Alternatively, when the optical fiber in the direction from the node 2 to the node 1 is also broken, the RSVP notify message is transmitted to the node 1 on another path.

After receiving the RSVP notify message, the node 1 learns of the affected services 1 to 3 based on the fault information, and automatically determines a restoration path (for example, node 1-node 4-node 3 shown in FIG. 2) that can continue to implement the service 1 to the service 3. Then, the nodes in the ASON establish cross-connections hop by hop along the service restoration path (node 1-node 4-node 3) through RSVP-TE signaling (Path and Resv messages) to automatically establish an end-to-end restoration path. After the restoration path is established, the service 1 to the service 3 are automatically restored.

Figure 5:
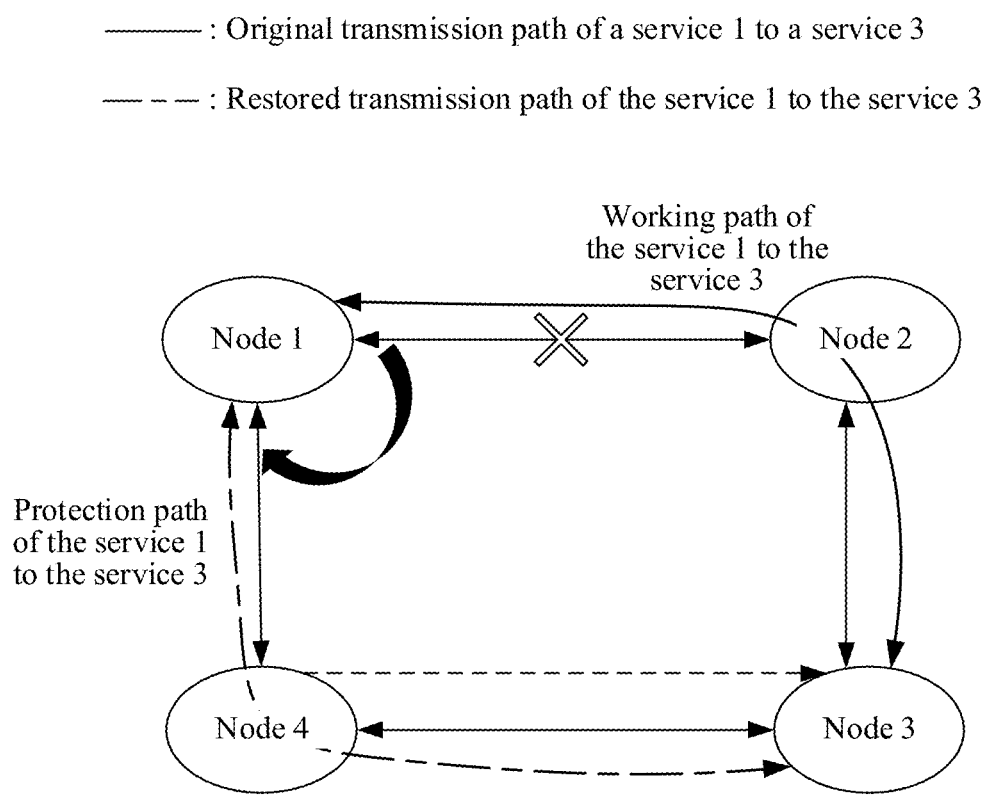
FIG. 5 is a schematic diagram of another service path restoration method according to an embodiment of this application.

FIG. 5 is another schematic diagram of service path restoration. A 1+1 dedicated protection group is configured between a node 1 and a node 4 to implement fast service switching after a fault occurs in a network.

As shown in FIG. 5, a working path node 1-node 2-node 3 and a protection path node 1-node 4-node 3 of the service 1 to the service 3 are established through RSVP-TE. A head node 1 of the service 1 to the service 3 dually feeds two paths of service information through the working path and the protection path, and a sink node 3 selectively receives one path of information, for example, selectively receives service data on the working path. Fault statuses of the working path and the protection path are detected by using dedicated overheads of a protection group protocol. When a fault occurs on a link between the node 1 and the node 2, the node 1 or the node 3 quickly senses the fault, initiates fast switching of a current node protection group, and switches the service 1 to the service 3 from the working path to the protection path.

It should be noted that, service path restoration may also be understood as service restoration. This is because after a service path is restored, transmission of a service carried on the service path can be restored accordingly.

In the service restoration methods shown in FIG. 4 and FIG. 5, only switching of a service path at a layer L1 is performed, that is, only a layer L1 service can be restored. In addition, when the layer L1 service is restored, for a metropolitan/core ASON, as shown in FIG. 4, real-time rerouting can be performed to restore the layer L1 service only after a fault occurs in an optical fiber in a network. The performance is relatively slow. In the restoration method shown in FIG. 5, although restoration of a layer L1 service may be performed by using an established protection path, protection costs are high, and twice a resource needs to be occupied. Therefore, after a fault occurs on a working path of an L3 service, how to quickly restore the L3 service with relatively low resource costs is still in a blank phase currently.

First, concepts related to the layer L1 and the L3 are described herein to better understand this application.

The layer L1 refers to a physical layer, is a lowest layer in an Open Systems Interconnection (OSI) reference model, and provides mechanical, electronic, functional, and standard features for creating, maintaining, and removing a physical link required for data transmission. Simply, the physical layer ensures that raw data can be transmitted over various physical media. For the layer L1 service, all nodes at the physical layer transmit data of the layer L1 service from the head node to the sink node in a circuit switching manner.

The L3 refers to a network layer, is a third layer in the OSI reference model and between a transport layer and a data link layer, and further manages data communication in the network based on a data frame transmission function provided by the data link layer between two adjacent endpoints, to transmit data from a source node to the sink node through several intermediate nodes, thereby providing the most basic end-to-end data transmission service to the transport layer. For the L3 service, data of the layer L3 service is transmitted from the head node to the sink node through routing and forwarding by the head node and the last node and through circuit switching by the intermediate nodes.

To quickly restore the L3 service at relatively low resource costs, an embodiment of this application provides a service restoration method and a network node. In the service restoration method, a shared protection section of different services is established between network nodes, to reduce resource costs. In addition, in the service restoration method, end-to-end route switching can be implemented, so that the L3 service can be quickly restored.

Figure 6:
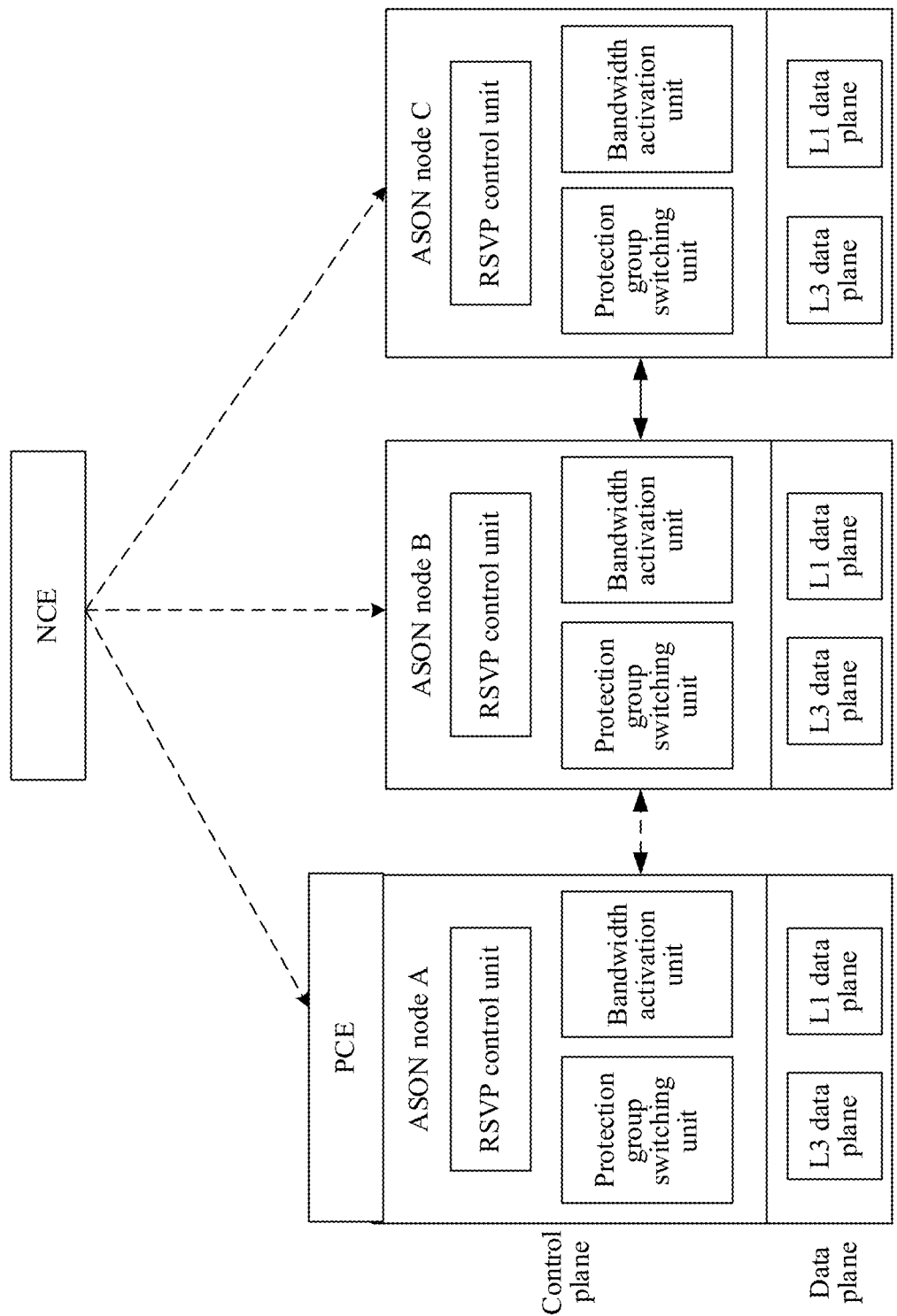
FIG. 6 is a schematic diagram of node configuration in an ASON according to an embodiment of this application.

FIG. 6 is a schematic diagram of node configuration in an ASON according to an embodiment of this application. As shown in FIG. 6, the architecture includes an intelligent network management system (e.g., Network Cloud Engine (NCE)), a node A, a node B, and a node C. An ASON automation function is enabled on each node, and an RSVP control unit, a protection group switching unit, and a bandwidth activation unit are deployed on each node.

The ASON architecture further includes a network device for path computation. For example, the network device includes a path computation element (PCE) controller, that is, at least one PCE controller is disposed in the ASON. Alternatively, the network device is a node that has a path computation function. For example, a PCE controller is deployed on at least one node in the ASON. For another example, a path computation function module is deployed on at least one node in the ASON.

The NCE is used to automatically provision or delete a service.

When being a head node of the service, the node A may include the PCE controller. The PCE controller is configured to compute a shared protection path of the service based on a bandwidth sharing policy, manage a life cycle of the shared protection path, such as configuring, deleting, and updating the path, and configure a service relationship of a plurality of protection paths that share a bandwidth.

The RSVP control unit is configured to create, delete, update and re-establish a service shared protection path, and is further configured to perform end-to-end maintaining of the shared protection path.

The protection group switching unit is configured to, after a head node of the service or a last node of the service senses that a fault occurs on a working path of the service, perform fast protection group switching, switch a current working route to a working route corresponding to the protection path, and switch the working path from the working path to the protection path of the service.

The bandwidth activation unit is configured to activate a bandwidth of the end-to-end protection path after the head node of the service finds, after sensing that a fault occurs on a working path, a corresponding service ID and generates channel associated signaling including the service ID, and activate and configure a target bandwidth of the service after an intermediate node of the service performs centralized bandwidth decision processing based on received channel associated signaling. The centralized bandwidth decision processing means that after receiving the channel associated signaling, the intermediate node of the service first determines whether a current remaining bandwidth is greater than the target bandwidth of the service, and if yes, the bandwidth of the service may be directly activated and configured as the target bandwidth, or if no, an associated and shared service is first found, a bandwidth occupied by the associated and shared service is adjusted to 0, and then the bandwidth of the service is activated and configured as the target bandwidth.

It should be noted that, "channel associated" in this application represents that a cross-connection of the protection path of the service is already established before the service is provisioned. Therefore, when the fault occurs on the working path of the service, a head node of the protection path (which may also be a head node of a protection section) transmits signaling used for bandwidth activation to a sink node of the protection path (or a sink node of a protection section) along the protection path, that is, the channel on which the cross-connection is already established. This channel is a dedicated channel for a faulty service, and therefore does not need to carry a service ID but carries only bandwidth activation information. This process is referred to as channel associated signaling transmission. What needs to be distinguished from this is common channel signaling transmission. The common channel signaling transmission means that signaling used for restoring a specific service is sent in a channel shared by a plurality of services. Therefore, to enable a target node to accurately identify the service that needs to be restored, an ID of the service that needs to be restored needs to be carried in the signaling. In this application, service protection is mainly performed in a manner of sending channel associated signaling, that is, a service switching message mentioned below is sent in a channel associated manner.

It should be understood that FIG. 6 is merely a schematic diagram provided for ease of understanding of this application, and does not constitute any limitation on the protection scope of this application. Names of the foregoing units are merely examples, and the units shown in FIG. 6 may be replaced by other units or modules that can implement same functions.

It should be understood that before a fault occurs on a path, a service protection group needs to be configured for a network node. The service protection group in this application mainly includes two parts. The first part is configuration of a shared protection group, and the other part is configuration of a routing protection group. The shared protection group refers to configuring the protection path for the service in a shared protection manner, to improve a reuse rate of the path. The routing protection group means that after the protection path is configured for the service, the routing protection group needs to be configured for the service, so that when performing switching of the protection path, the head node and the last node of the service may complete route switching based on the routing protection group, thereby switching an L3 service to the protection path for transmission, that is, completing protection switching of the L3 service.

In embodiments of this application, an example in which there are two L3 services (including a first service and a second service) and signaling transmission is performed by using an OSU frame is used to describe a service protection group configuration process.

In embodiments of this application, a node that has a path computation function and a PCE controller are collectively referred to as a network device. The first service is carried on a first working path. A head node on the first working path is referred to as a first head node, and a last node is referred to as a first sink node. The second service is carried on a second working path. A head node of the second working path is referred to as a second head node, and a last node is referred to as a second sink node. It should be noted that, the network device may be the first head node, or the network device may be the second head node. In this application, a process of configuring a service group is described by using an example in which the first protection path and the first working path have a same sink node (the first sink node), and the second protection path and the second working path have a same sink node (the second sink node).

It should be further noted that, the first working path and the second working path may be a same working path, that is, a plurality of services are carried on the working path. In addition, the first protection path corresponding to the first working path and the second protection path corresponding to the second working path may also be a same protection path, and the protection path may be used to restore a plurality of services carried on a specific working path.

Figure 7:
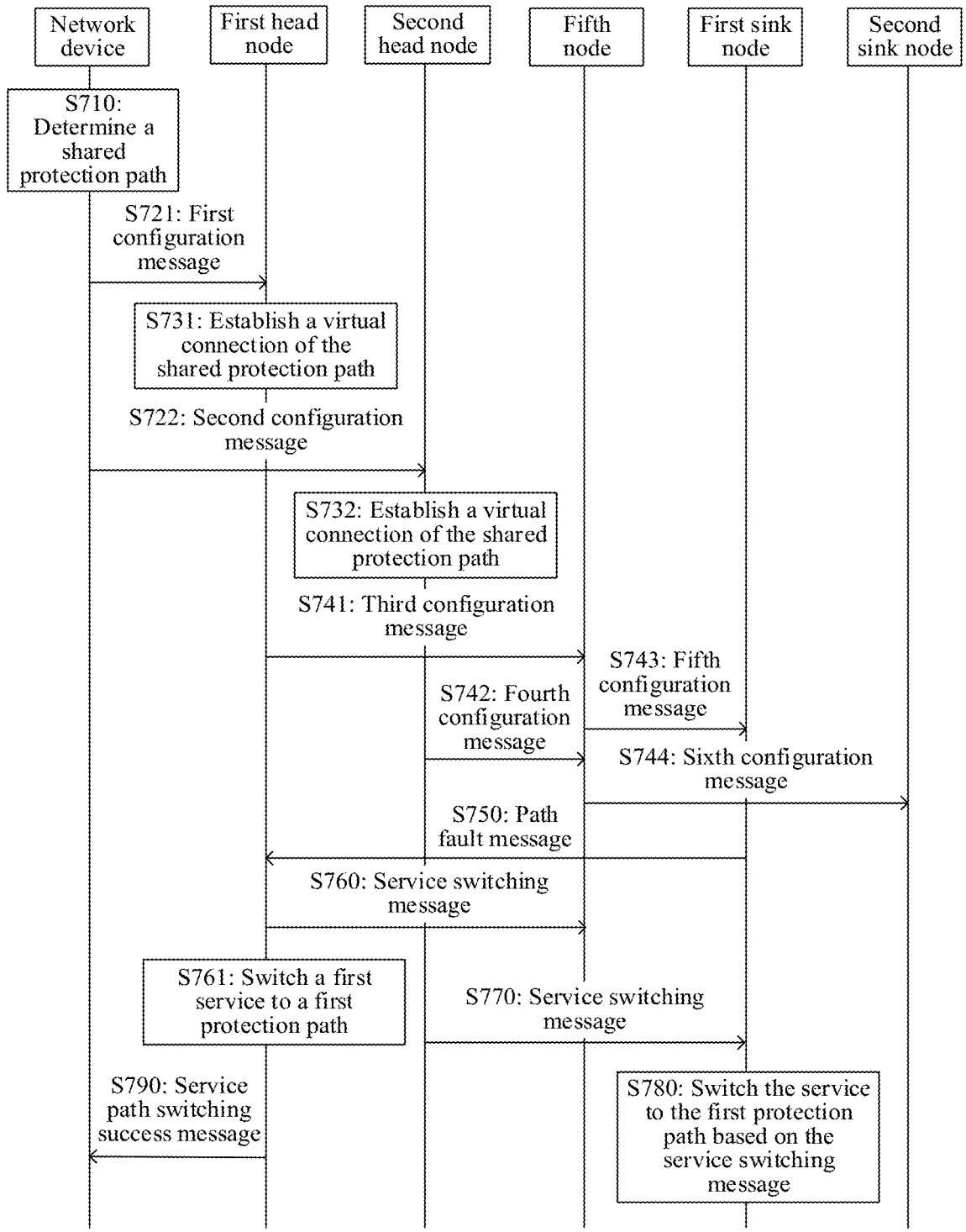
FIG. 7 is a system sequence diagram of a service protection method according to an embodiment of this application.

FIG. 7 is a system sequence diagram of a service protection method according to an embodiment of this application. The service protection method may be applied to an ASON. The ASON may include a plurality of nodes shown in FIG. 6. The service protection method includes at least all or some of the following steps.

S710: A network device determines a shared protection path.

For example, the network device may obtain network-wide nodes, service information, and other information such as a link in the ASON by using an OSPF/Path Computation Element Communication Protocol (PCEP) protocol, allocate a first working path to a first service based on an end-to-end split path policy, and determine a first protection path corresponding to the first working path. Similarly, the network device may allocate a second working path to a second service based on the end-to-end split path policy, and determine a second protection path of the second working path. The first protection path is used to perform protection switching on the first service carried on the first working path when a fault occurs on the first working path. The second protection path is used to perform protection switching on the second service carried on the second working path when a fault occurs on the second working path. The first protection path and the second protection path have a same protection path section.

In addition, when a path is allocated to a service, because the service is an L3 service, a physical trail (that is, the path) at a layer L1 further needs to carry corresponding routing information in addition to data during service transmission, so that the L3 service is transmitted in a route switching manner. Therefore, the network device may further allocate a corresponding virtual path (VP) to the working path and the protection path. The VP is a communication circuit, and describes a routing interface used by the head node and the last node to send or receive a data flow of the L3 service. Therefore, the head node and the last node may transmit the L3 service based on the VP allocated to the path. For example, a VP allocated to the first working path is a VP 1, and a VP allocated to the first protection path is a VP 2. In this way, when transmitting the first service on the first working path, the first head node may transmit the first service to a destination, that is, the first sink node, by using the VP 1 and the first working path. After the first service is switched to the first protection path, the first service may be transmitted to the destination (the first sink node) by using the VP 2 and the first protection path.

In this embodiment of this application, when allocating the protection path, the network device may determine, based on a faulty link shared protection policy, the protection path corresponding to the working path that carries the service, and bind and associate a plurality of services that have a same protection path section by using a service group ID. The service group ID identifies the plurality of services that have the same protection path section, or identifies a plurality of service paths that have the same protection path section. The ID in this embodiment may be understood as identification information, and is used to identify a service or a path used to carry the service. The identification information may also be referred to as index information or indication information. For ease of description, the identification information is referred to as an ID in the following.

The faulty link shared protection policy means that when determining, on a premise that a link in a network is assumed to be faulty, protection paths respectively corresponding to working paths affected by the faulty link, the network device enables a plurality of protection paths to have a same protection path section as much as possible, to improve a path use rate, thereby reducing deployment of a device resource.

The same protection path section in this embodiment of this application is a common part path section or an overlapping part path section between the first protection path and the second protection path, may also be understood as an overlapping protection path section, a shared protection path section, or the like, and is referred to as a protection path section in the following. In addition, the first protection path and the second protection path have a same protection path section, and the same protection path section may be some path sections of the first protection path or the second protection path, or may be all path sections of the first protection path or the second protection path.

A specific cause of occurrence of a fault on the working path is not limited in this embodiment of this application. That a fault occurs on the first working path in the foregoing may be that a fault occurs on one or more links of the first working path, that a fault occurs in a node on the first working path, that a fault occurs in an interface of a node on the first working path, or the like. Similarly, that a fault occurs on the second working path includes that a fault occurs on one or more links of the second working path, that a fault occurs in a node on the second working path, that a fault occurs in an interface of a node on the second working path, or the like.

It should be noted that, the path in this embodiment of this application has a directional property. The first working path and the first protection path are each a unidirectional path that uses the first head node as a sending node of the first service, and that a fault occurs on the first working path means that a fault occurs on the unidirectional path. Similarly, the second working path and the second protection path are each a unidirectional path that uses the second head node as a sending node of the second service, and that a fault occurs on the second working path means that a fault occurs on the unidirectional path.

The shared protection described in this embodiment may include the following cases: (1) 1:N sharing for services with a same rate, that is, one bandwidth resource is shared by N services of a same rate, where for example, N services whose rates are all 100 Mbit/s share a 100 M bandwidth, (2) 1:N sharing for services with different rates, that is, one bandwidth resource is shared by N services with different rates, where for example, three services with rates of 50 Mbit/s, 70 Mbit/s, and 100 Mbit/s share a 100 Mbit/s bandwidth, (3) M:N sharing for services with a same rate, where M<N, that is, M bandwidth resources are shared by N services of the same rate, where for example, ten 100 Mbit/s services share seven 100 Mbit/s bandwidth resources, and (4) M:N sharing for services with different rates, where M<N, that is, M bandwidth resources are shared by N services with the different rates, where for example, three services with rates of 50 Mbit/s, 70 Mbit/s, and 100 Mbit/s share a 100*2=200 Mbit/s bandwidth resource.

S720: The network device delivers a configuration message to the head node.

Further, this step includes the following step: S721: The network device delivers a first configuration message to a first head node, to preconfigure a routing protection group of the first service on the first head node. The first configuration message includes a routing protection group of the first protection path, that is, a correspondence between the first protection path and the routing protection group, and the routing protection group includes a primary route and a secondary route. The primary route is a working route used when the first head node transmits the L3 service on the first working path, and the secondary route is a working route used when the first head node transmits the L3 service on the first protection path.

For example, the routing protection group may be: primary route: destination: a cloud gateway address, a next-hop node-an egress VP 1-the first working path, and secondary route: destination: a cloud gateway address, a next-hop node-an egress VP 2-the first protection path.

In addition, the first configuration message may further include a shared protection group corresponding to the first protection path, to configure a shared protection group of the first service on the first head node, that is, whether a protection path section of the first protection path is shared, a shared degree of the protection path section, and a service group ID.

Similarly, this step further includes S722: The network device delivers a second configuration message to the second head node. The second configuration message includes a routing protection group of the second protection path, to preconfigure the routing protection group of the second service on the second head node, where the routing protection group includes a primary route and a secondary route. The primary route is a working route used when the second head node transmits the L3 service on the second working path, and the secondary route is a working route used when the second head node transmits the L3 service on the second protection path.

For example, the routing protection group may be: primary route: destination: a cloud gateway address, a next-hop node-a VP 1 egress-the second working path, and secondary route: destination: a cloud gateway address, a next-hop node-a VP 2 egress-the second protection path.

In addition, the second configuration message may further include a shared protection group of the second protection path, to preconfigure a routing protection group of the second service on the second head node, that is, whether a protection path section of the second protection path is shared, a shared degree of the protection path section, and a service group ID.

The shared degree of the first path or the second path indicates a quantity of services that share the protection path section, and the service group ID indicates a plurality of services that share the protection path section. In this embodiment of this application, an example in which the protection path section is shared by the first service and the second service, and the shared degree is 2 is used for description.

For example, the first configuration message may be a PCEP message, or the first configuration message may be a protocol message that has a same function as the PCEP. For example, the first configuration message may be implemented by using an added field (for example, an extended PCEP field) in original signaling between the network device and the first head node. This is not limited in this application.

For example, the second configuration message may be a PCEP message, or the second configuration message may be a protocol message that has a same function as the PCEP. For example, the second configuration message may be implemented by using an added field (for example, an extended PCEP field) in original signaling between the network device and the second head node. This is not limited in this application.

In this embodiment of this application, the network device may further notify a fifth node of the first configuration message. The routing protection group is only used when the head node and the last node transmit data, and an intermediate node on the path only forward data. Therefore, when the first configuration message is notified to the fifth node, the routing protection group of the first protection path is transparently transmitted only at the fifth node, and the fifth node is only notified of whether the protection path section of the first protection path is shared, the shared degree of the protection path section, and the service group ID, when the second configuration message is notified to the fifth node, the routing protection group of the second protection path is transparently transmitted only at the fifth node, and the fifth node is only notified of whether the protection path section of the second protection path is shared, the shared degree of the protection path section, and the service group ID.

The fifth node is a head node of the protection path section. It may be understood that the fifth node may be any node on the protection path other than the first head node and the first sink node.

Further, based on an identity of the network device in the network, the network device delivers the configuration message to the head node in the following manners.

Manner 1: The network device is a PCE.

The network device is a PCE controller disposed in the network, and the PCE controller is a device deployed independently of the head node of the working path and the head node and the last node of the protection path section.

In manner 1, after generating the first configuration message and the second configuration message, the network device needs to notify the first configuration message to the first head node, and notify the second configuration message to the second head node.

The first configuration message includes the routing protection group of the first protection path, and may further include whether the protection path section of the first protection path is shared, the shared degree of the protection path, and the service group ID. The second configuration message includes the routing protection group of the second protection path, whether the protection path section is shared, the shared degree, and the service group ID.

For example, the first configuration message may be one message or may be a collective name of a plurality of messages. That is, routing information, shared group information, and the service group ID of the first protection path may be sent to the first head node by using one message, or may be sent to the first head node by using a plurality of messages. For example, the network device may notify the first head node of the routing protection group of the first protection path by using one first configuration message, and then notify the first head node of whether the protection path section of the first protection path is shared, the shared degree of the protection path, and the service group ID by using another first configuration message. Similarly, the second configuration message may be one message or may be a collective name of a plurality of messages, that is, routing information, shared group information, and the service group ID of the second protection path may be sent to the second head node by using one message, or may be sent to the second head node by using a plurality of messages. This is not limited in this application.

In this embodiment, the first configuration message and the second configuration message may be referred to as extended type-length-value (TLV) information. TLV is a variable format, meaning: type, length, and value. The type field is information about a label and an encoding format. The length field is a length of a defined value. The value field indicates an actual value. Lengths of type and length are usually fixed, for example, 2 or 4 bytes.

A packet format of the first configuration message and the second configuration message in this application may be shown as follows:

PCEP<Path Message>:=
<Common Header>
<MESSAGE-ID>
<HOP object>

Added<shared group information>TLV "In the HOP object, the added shared group information includes: routing protection group, whether to share, shared degree, and shared service group ID".

Figure 15:
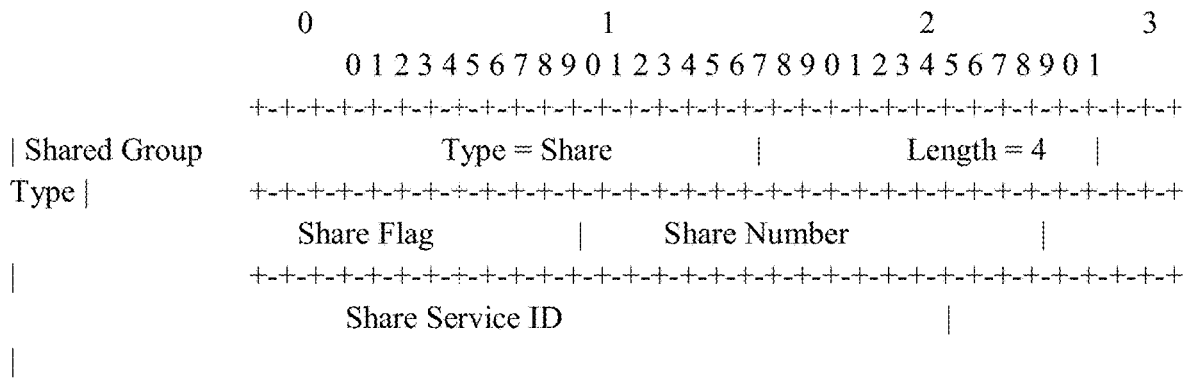
FIG. 15 is a schematic diagram of a message format according to an embodiment of this application.

A message format of the shared group information is shown in FIG. 15. FIG. 15 is a schematic diagram of a message format of shared group information according to an embodiment of this application. Meanings and values of fields included in FIG. 15 are shown in Table 1.

TABLE 1

| Field Name | Meaning | Value |
|---|---|---|
| Type | a TLV type, an added Hop shared type | One 16-bit value |
| Length | TLV length, in a unit of byte | One 16-bit value |
| Share Flag | Whether the Hop resource is shared | One 16-bit value |
| Share Number | Shared degree of the Hop resource | One 16-bit value |
| Share Service ID | Shared service group ID | One 32-bit value |

Manner 2: The network device is the first head node.

If the network device is the first head node, the first head node can learn of the routing protection group and the shared group information of the first protection path by itself. A difference from manner 1 lies in that the network device does not need to send the first configuration message to the first head node in manner 2, that is, S721 does not need to be performed.

Manner 3: The network device is the second head node.

If the network device is the second head node, the second head node can learn of the routing protection group and the shared group information of the second protection path by itself. A difference from Manner 1 lies in that the network device does not need to send the second configuration message to the second head node in manner 3, that is, S722 does not need to be performed.

Manner 4: The network device is the head node of the protection path section.

If the network device is the head node of the protection path section, the head node on the protection path section can learn of the routing protection group of the protection path section. A difference from manner 1 lies in that the network device does not need to send the configuration message to the head node of the protection path section in manner 4, that is, the network device does not need to send a third configuration message and a fourth configuration message to the head node of the protection path section.

A signaling interaction procedure between other nodes (a first head node, a second head node, and a sink node) and the network device is the same as that in manner 1, and details are not described herein again.

S730: The head node of the service establishes the service protection group based on the configuration message.

This step is described by using manner 1 as an example.

This step includes the following steps. S731: The first head node establishes the service protection group of the first protection path based on a received first configuration message used to switch the first service to the first protection path for transmission when a fault occurs on the first working path for transmitting the first service. S732: The second head node establishes the service protection group of the second protection path based on a received second configuration message used to switch the second service to the second protection path for transmission when a fault occurs on the second working path for transmitting the second service.

S740: The head node of the service sends the configuration message to downstream nodes.

This step may include the following steps.

S741: The first head node sends the third configuration message to the fifth node.

S742: The second head node sends the fourth configuration message to the fifth node.

S743: The fifth node sends a fifth configuration message to the sink node of the first working path.

S744: The fifth node sends a sixth configuration message to the sink node of the second working path.

The fifth node is an intermediate node on the protection path, and does not need to perform route switching and service switching, but only needs to adjust a bandwidth. Therefore, the third configuration message needs to include only information related to bandwidth adjustment, that is, includes whether the protection path section of the first protection path is shared, the shared degree, and the service group ID. Similarly, the fourth configuration message also includes only information related to bandwidth adjustment, that is, includes whether the protection path section of the second protection path is shared, the shared degree, and the service group ID. The sink node needs to perform route switching and service switching. Therefore, the fifth configuration message includes the routing protection group corresponding to the first protection path, and whether the protection path section of the first protection path is shared, the shared degree, and the service group ID. The sixth configuration message includes the routing protection group corresponding to the second protection path, and whether the protection path section of the second protection path is shared, the shared degree, and the service group ID.

In a possible manner, the network device may respectively deliver the first configuration message, the second configuration message, the third configuration message, the fourth configuration message, the fifth configuration message, and the sixth configuration message to corresponding nodes. It should be understood that the nodes in this embodiment are merely used as examples, and do not constitute a limitation on the technical solution. Actually, the working path and the protection path of the service may pass through many nodes. In this embodiment, only a simplest node architecture is provided.

After receiving a corresponding configuration message, the downstream nodes each locally establish a virtual connection of the protection path. The details are as follows. The fifth node establishes a virtual connection of the first protection path based on the third configuration message, and the fifth node establishes a virtual connection of the second protection path based on the fourth configuration message. The first sink node establishes a virtual connection of the first protection path based on the fifth configuration message, and the second sink node establishes a virtual connection of the second protection path based on the sixth configuration message. The virtual connection means that the first protection path occupies only a small bandwidth resource (for example, 2 megabits (M) of each node, used to establish a cross-connection of the first protection path corresponding to the first service, but the first service is not transmitted on the protection path. To distinguish from a target bandwidth of the service, in this embodiment of this application, a bandwidth occupied for establishing the protection path is referred to as a guard bandwidth.

By establishing the virtual connection of the protection path, not only a switching speed can be improved when a fault occurs on the working path of the service, but also the protection path does not need to occupy twice a bandwidth resource. This reduces costs.

It should be noted that, because the first sink node is the last node of the first working path, and is different from the intermediate node, a shared protection group and a routing protection group need to be configured in the first sink node, so that when a fault occurs on the first working path for transmitting the first service, the first service can be quickly switched to the first protection path for transmission. Similarly, because the second sink node is the last node of the second working path, a shared protection group and a routing protection group need to be established in the second sink node, so that when a fault occurs on the second working path for transmitting the second service, the second service can be quickly switched to the second protection path for transmission.

For example, the cross-connection of the virtual connection in this embodiment may include an ingress port, a channel, a bandwidth, and an egress port of the first service on a current node, and an ingress port, a channel, a bandwidth, and an egress port of the second service on a current node. For example, the first service passes through ingress port 1-channel 1-egress port 1 on the current node, and occupies 2 M bandwidth. For another example, the second service passes through ingress port 2-channel 2-egress port 2 on the current node, and occupies 2 M bandwidth.

For example, the configuration message sent by the head node of the service to the downstream nodes in this embodiment may be an RSVP-TE signaling message, or the foregoing configuration message may be a protocol message having a same function as RSVP-TE. For example, the third configuration message may be implemented by using an added field (for example, an extended RSVP field) in original signaling between the first head node and the fifth node.

A packet format of the configuration message in this application may be shown as follows:

```
RSVP<Path Message>:=
<Common Header
<MESSAGE-ID>
<SESSION>object
<HOP>object
<HOP of the fifth node>object
Added<shared group information>TLV
<TIME VALUES>object
<LABEL REQUEST>object
<EXPLICIT_ROUTE>object
```

Figure 16:
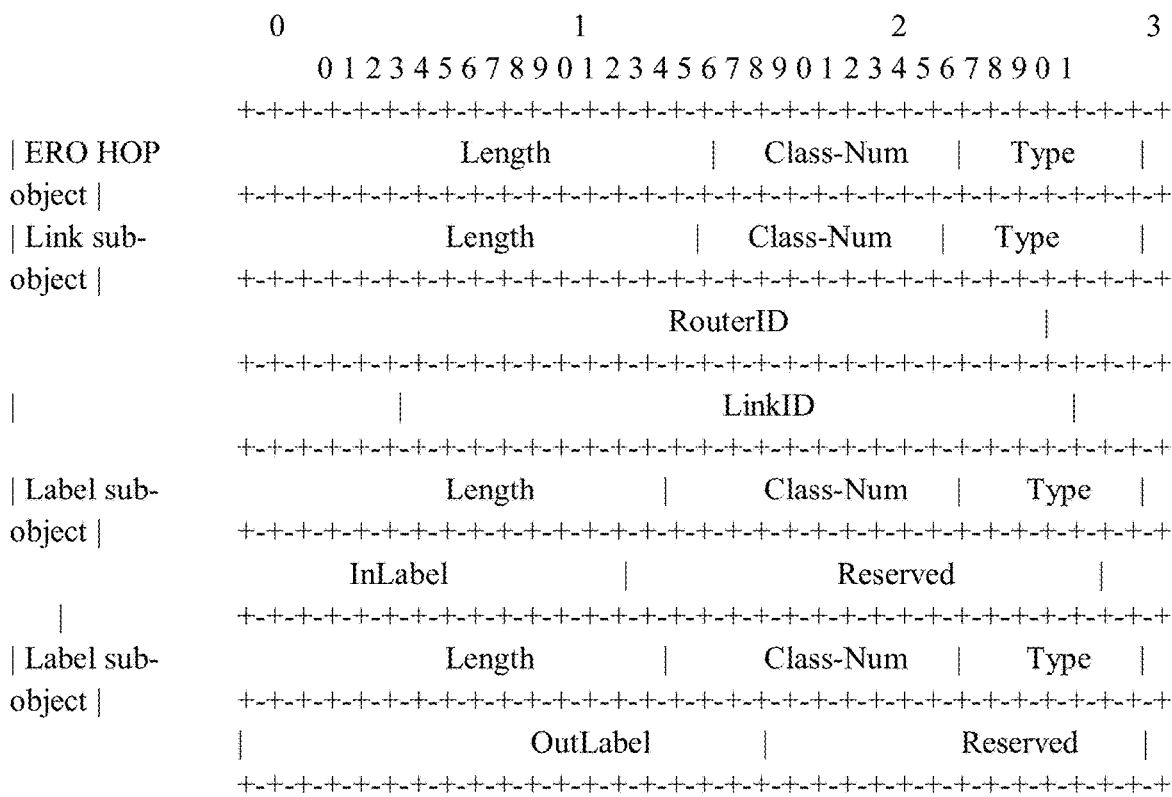
FIG. 16 is a schematic diagram of a related field in a message according to an embodiment of this application.

A schematic diagram of a related TLV field for indicating that a specific hop type in an RSVP message is a virtual connection for protection is shown in FIG. 16, and a meaning is shown in Table 2.

TABLE 2

| Field Name | Meaning | Value |
| --- | --- | --- |
| Length | Total object length, in a unit of byte | One 16-bit value |
| Class-Num | Identifies an object class, where each object class has a name. | One 8-bit value |
| Type | Object type, which is unique in Class-Num, a value of this field indicates a hop type of the virtual connection for protection. | One 8-bit value |
| RouterID | Node ID address | One 32-bit value |
| LinkID | Outgoing link ID | One 32-bit value |
| InLabel | In label, indicating a channel/wavelength. | One 16-bit value |
| Reserved | Reserved byte | One 16-bit value |
| OutLabel | Out label, indicating a channel/wavelength. | One 16-bit value |
| Reserved | Reserved byte | One 16-bit value |

It should be noted that, after the downstream nodes each establish a virtual connection of a protection path based on a configuration message, this step further includes the following. Each of the downstream nodes sends a response message to the head node, for indicating that a current node already establishes a virtual connection of a protection path of a service. For example, the fifth node sends a first response message to the first head node, for indicating that the first node already establishes the virtual connection of the protection path of the first service. In addition, the fifth node sends a second response message to the second head node, for indicating that the fifth node already establishes the virtual connection of the protection path of the second service. The first sink node sends a third response message to the first head node, for indicating that the first sink node already establishes the virtual connection of the protection path of the first service. The second sink node sends a fourth response message to the second head node, for indicating that the second sink node already establishes the virtual connection of the protection path of the second service.

For example, after receiving the response message sent by each node on the first protection path, the first head node reports a message indicating that the virtual connection of the first protection path is successfully established to the NCE, and the NCE delivers the first service to the first head node.

For example, after receiving the response message sent by each node on the second protection path, the second head node reports a message indicating that the virtual connection of the second protection path is successfully established to the NCE, and the NCE delivers the second service to the second head node.

S750: The first head node receives a path fault message from the first sink node.

In this embodiment, when a fault occurs on the working path between the first head node and the first sink node, the fault may be, for example, a layer L1 fault, for example, a fault that occurs on a node on the first working path, or a fault that occurs on a link between adjacent nodes on the first working path, for example, a fiber break. The fault may alternatively be an L3 fault, for example, a fault that occurs on a working route of the first head node and/or the first sink node. The first sink node sends a path fault message to the first head node, where the path fault message indicates that a fault occurs on the first working path between the first head node and the first sink node.

For example, the path fault message may be carried in an overhead of a data frame.

For example, the path fault message includes an ID of an affected service, and further includes APS message. The APS message indicates the first head node to switch the first service to the first protection path.

It should be noted that, in this embodiment, that the first head node receives the path fault information from the first sink node is merely an example, and actually does not constitute a limitation on the technical solution. For example, when there is another node on the first working path between the first head node and the first sink node, alternatively, the other node may receive the path fault information from the first sink node. The node may be the head node of the protection path section, or the first head node may sense by itself that a fault occurs on the working path, and does not need to receive the path fault information sent by the first sink node.

For example, after the first head node receives the path fault message and determines that a fault occurs on the first working path currently used to transmit the first service, the first head node generates a service switching message based on the fault message.

S760: The first head node sends the service switching message to the fifth node.

For example, the first head node inserts the service switching message into a first data frame, and the service switching message may indicate each downstream node on the first working protection path to activate and configure a target bandwidth of the first service.

Further, the service switching message includes at least a bandwidth activation message, the bandwidth activation message includes at least the target bandwidth of the first service, and the target bandwidth indicates the downstream node to adjust a bandwidth of the first service from a guard bandwidth to the target bandwidth. The guard bandwidth is a bandwidth occupied for establishing the virtual connection of the first protection path for the first service.

For example, the service switching message may further indicate the downstream node (a sink node of the first protection path) of the first protection path to switch a working route. Further, the service switching message may further include an APS type message, and the APS type message indicates the sink node of the first protection path to switch the working route.

For example, the service switching message may further indicate the downstream node (a sink node of the first protection path) of the first protection path to switch the first service to the first protection path. Further, the service switching message may further include an APS message, and the APS message indicates the sink node of the first protection path to switch the first service to the first protection path.

For example, the first data frame includes a payload area. The bandwidth activation message, the APS type message, and the APS message may all be carried in the payload area of the first data frame.

For example, the payload area further includes at least one of the following information: a protocol packet length, a message type, a version number, and a service ID of the first protection path, where the message type indicates that the first data frame carries the bandwidth activation message, the APS type message, and the APS message.

For example, after sending the service switching message to the downstream node on the first protection path, the first head node switches the first service to the first protection path. In this way, the service switching message is sent first and then a local protection group is switched. On the one hand, it can be ensured that the service switching message can be sent smoothly. This is because if the protection group is switched first, a bandwidth of a service data flow is usually much greater than the guard bandwidth because the downstream node has not completed bandwidth adjustment, resulting in difficulty in sending of the service switching message. On the other hand, it can be ensured that the service switching message is quickly transmitted to a peer node to perform protection switching, thereby quickly restoring the service.

In addition, before performing this step, the first head node further needs to perform the following steps of obtaining a service ID of an affected service in the path fault message, that is, the service ID of the first service, and finding, based on the service ID, a corresponding virtual connection service ID for performing shared protection. The virtual connection service ID may be used by the downstream node to determine whether another service shares a bandwidth resource with the first service on the protection path section.

Afterwards, the intermediate node on the first protection path completes configuration of the target bandwidth of the first service based on the bandwidth activation message in the service switching message. The sink node on the first protection path respectively completes configuration of the target bandwidth of the first service, switching of the working route (switching of the working route to a secondary route corresponding to the first protection path), and switching of the first service based on the bandwidth activation message, the APS type message, and the APS message in the service switching message, that is, the first service is switched to the first protection path.

Afterwards, after performing the foregoing step, the first head node further needs to perform the following step.

S761: The first head node switches the first service to the first protection path.

For example, the first head node first adjusts the bandwidth of the first protection path from the guard bandwidth to the target bandwidth, and switches a current working route from a primary route to the secondary route corresponding to the first protection path. Then, the first service is switched to the first protection path.

S770: The fifth node forwards the service switching message to the first sink node.

For example, after receiving the service switching message, the fifth node adjusts the bandwidth of the first protection path from the guard bandwidth to the target bandwidth based on the bandwidth activation message in the service switching message, and forwards the service switching message to the first sink node.

S780: The first sink node switches the first service to the first protection path based on the service switching message.

For example, after receiving the service switching message, the first sink node parses the service switching message to obtain the bandwidth activation message, the APS type message, and the APS message.

Further, the first sink node switches the current working route from the primary route to the secondary route based on the APS type message, adjusts the bandwidth of the first protection path from the guard bandwidth to the target bandwidth based on the bandwidth activation message, and switches the first service to the first protection path based on the APS message. The following describes in detail a process of adjusting a bandwidth by each node and a process of switching a route by the head node and the last node. This is not described in detail herein.

S790: The first head node sends service path switching success information to the network device.

If detecting that there is no end-to-end service status alarm, the first head node notifies the network device that the first service has been successfully switched from the first working path to the first protection path.

The following uses service protection for the first service as an example to describe the service protection method in this application. The first service is also referred to as a service in the following, and details are not described again. In the following, the first head node of the first working path is referred to as a first node, the sink node of the first working path is referred to as a second node, the first head node of the first protection path is also referred to as the first node, the sink node of the first protection path is referred to as a third node, and any node other than the first node and the third node on the first protection path is referred to as a fourth node.

Figure 8:
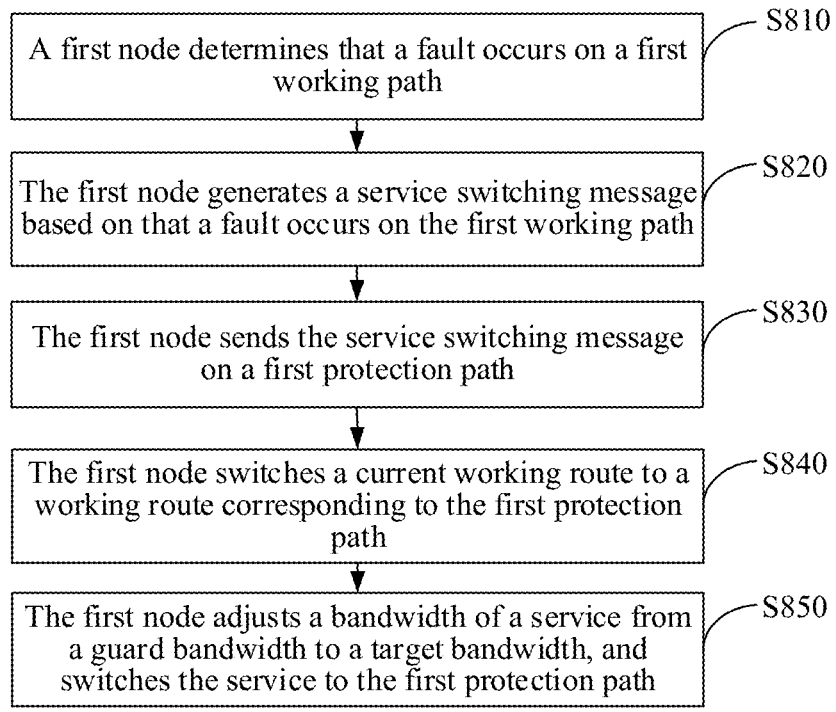
FIG. 8 is a schematic flowchart of a service protection method according to an embodiment of this application.

FIG. 8 is a schematic flowchart of a service protection method according to an embodiment of this application. The method may be executed by the first head node, namely, the first node, in FIG. 7.

S810: The first node determines that a fault occurs on a first working path.

For example, the first node receives a path fault message from a second node, and the path fault message indicates that a fault occurs on the first working path between the first node and the second node, so that the first node determines that a fault occurs on the first working path.

Further, the fault that occurs on the first working path may include: a layer L1 fault, for example, a fault that occurs on a node on the first working path, or a fault that occurs on a link between adjacent nodes on the first working path, for example, a fiber break. The fault may alternatively be an L3 fault, for example, a fault that occurs on a working route of a head node and/or a last node on the first working path. This is not limited in this embodiment. The first node determines, based on the path fault message, that a fault occurs on the first working path.

For example, the path fault message may be an RSVP notify message. The RSVP notify message is a path event notification message. For a format of the RSVP notify message, refer to an existing notify message, which carries an ID of an affected service and fault point information. The fault point information may include a fault of a link between a node and an adjacent node, a fault of a node port, or a fault of another type. This is not limited in this embodiment. For example, the path fault message carries a service ID of the affected service and fault point information of a fault that occurs on a link between the first node and the second node.

For example, the path fault message may be inserted by the second node into a second data frame for transmitting to the first node. The following uses an example in which the second data frame is a second OSU frame for description.

For example, the path fault information may be inserted by the second node into an operation administration and maintenance (OAM) overhead of the second OSU frame.

Optionally, that the first node receives a path fault message includes the following. The first node receives a second OSU frame from the second node, demaps the second OSU frame to obtain an OSU frame, and then obtains the path fault message from an OAM overhead of the OSU frame.

S820: The first node generates a service switching message based on that a fault occurs on the first working path.

For example, because a first protection path is a virtual connection, before the service is switched, the first protection path occupies only a small bandwidth resource, for example, 2 M, which is referred to as a guard bandwidth in this application, and represents a pre-occupied bandwidth of the first protection path before the service is transmitted. Therefore, to switch the service to the first protection path, the bandwidth occupied by the first protection path needs to be adjusted from the guard bandwidth to a target bandwidth required by the service. Therefore, the service switching message includes at least a bandwidth activation message, where the bandwidth activation message indicates each node on the first protection path to adjust the bandwidth of the first protection path from the guard bandwidth to the target bandwidth, for example, 100 M, to normally transmit the service.

For example, the first node first determines the target bandwidth of the service based on the ID of the affected service carried in the path fault message. For example, the first node may further determine a virtual connection service ID of the service based on the ID of the affected service carried in the path fault message, and use the virtual connection service ID as a sending option. The first node pre-stores a correspondence between the ID of the affected service and the virtual connection service ID in the node, and obtains the correspondence when receiving the path fault message sent by another node.

Optionally, if the first node converts the target bandwidth into the bandwidth activation message in the service switching message, the bandwidth activation message may indicate each node on the first protection path to adjust the bandwidth of the first protection path from the guard bandwidth to the target bandwidth.

Further, the first node may insert the bandwidth activation message in the service switching message into the first data frame.

The following uses an example in which the first data frame is a first OSU frame description.

In this embodiment, as a flexible encapsulation format in an OTN network, a length of the first OSU frame may be 192 bytes, or one of 240 bytes, 128 bytes, or 64 bytes, or may be another quantity of bytes with development of technologies. This is not limited in this application. That the length of the first OSU frame is 192 bytes is used only as an example for description. The first OSU frame includes an overhead area (overhead) and a payload area (payload). The payload area field may be customized.

For example, the bandwidth activation message may be inserted into the payload area of the first OSU frame, and occupies four bytes, that is, 32 bits in total.

In an implementation of this application, when the second node and the third node are a same node, that is, when the second node and the third node are actual sink nodes that transmit the service, the first node may further generate an APS type message based on that a fault occurs on the first working path. The APS type message indicates the sink node (the third node) of the first protection path to switch a working route. In this case, the service switching message further needs to include the APS type message. It should be noted that, the APS type message in the service switching message is transparently transmitted at an intermediate node (for example, the fourth node) of the first protection path, and is obtained only at the sink node, that is, the APS type message may be obtained by the third node. The intermediate node obtains only the bandwidth activation information.

For example, the APS type message may alternatively be inserted into the payload area of the first OSU frame, and occupies two bytes, that is, 16 bits in total. The APS type message indicates the sink node of the first protection path to switch the working route.

Further, because the third node is a real sink node of the first protection path, the third node further needs to complete service switching. Therefore, the service switching message further needs to include an APS message, where the APS message indicates the sink node, namely, the third node, of the first protection path, to switch the service to the first protection path.

For example, the APS message may alternatively be inserted into the payload area of the first OSU frame, and occupies two bytes, that is, 16 bits in total. It should be noted that, the APS message is transparently transmitted at an intermediate node (for example, the fourth node) on the first protection path, and is obtained only at a sink node, that is, the APS message may be obtained by the third node. The intermediate node obtains only the bandwidth activation information.

It should be understood that, when the second node and the third node are not a same node, that is, when the third node is not a real sink node for transmitting the service, for example, if the service is data obtained from a cloud server, sink nodes of the first working path and the first protection path are cloud POP nodes. When the sink node is a cloud POP node, the third node only needs to complete bandwidth activation, and does not need to perform service switching or route switching. Both service switching and route switching occur at the cloud POP node. For example, the third node may indicate the cloud POP node to perform service switching and route switching. How the cloud POP node performs service switching and route switching is not a focus concerned in this application, and is not excessively described. Therefore, in this case, the service switching message generated by the first node needs to include only the bandwidth activation message, and the APS type message and the APS message do not need to be generated. That is, only the bandwidth activation message needs to be inserted into the payload area of the first OSU frame.

Optionally, the first OSU frame further carries a protocol packet length. The protocol packet length is inserted into the payload area, and occupies one byte, that is, eight bits in total.

Optionally, the first OSU frame further carries a message type, indicating that the OSU frame carries the bandwidth activation message and/or the APS message and/or the APS type message. The message type is inserted into the payload area and occupies one byte, that is, eight bits in total.

Optionally, the first OSU frame further carries a service ID, which is a virtual connection service ID in this embodiment. As a unique identifier of an end-to-end path, the virtual connection service ID is used by a downstream node to determine whether another service shares a bandwidth with the first service. The virtual connection service ID is inserted into the payload area and occupies four bytes, that is, 32 bits in total.

Figures 17, 18:
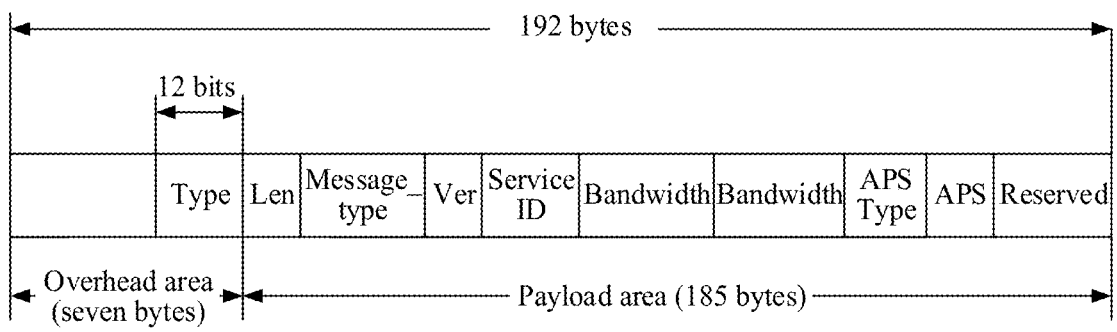
FIG. 17 is a schematic diagram of a payload area according to an embodiment of this application.
FIG. 18 is a schematic diagram of a frame format according to an embodiment of this application.

FIG. 17 is a schematic diagram of a payload area according to the embodiments. Meanings of fields are shown in Table 3. FIG. 18 is a schematic diagram of a frame format of a first OSU frame.

TABLE 3

| Field Name | Meaning | Value |
| --- | --- | --- |
| Length | Protocol packet length | One 8-bit value |
| Message_Type | Specific message type: indicates bandwidth activation + APS dual-end switching. | One 8-bit value |
| Ver | Version number | One 8-bit value |
| Service Id | Virtual connection service ID, which is a unique identifier ID of an end-to-end path. | One 32-bit value |
| Bandwidth | Service bandwidth attribute | One 32-bit value |
| APS Type | Extended APS switching type, which is layer 3 service route switching. | One 16-bit value |
| APS | Protocol dual-end switching byte, consistent with definition in a standard. | One 16-bit value |
| Resv | Reserved byte, for future service attribute extension | |

It should be understood that the APS type message and the APS message that are carried in the payload area in Table 3 are optional. When the second node and the third node are not a same node, the APS type message and the APS message do not need to be carried and only the bandwidth activation message needs to be carried in the payload area.

S830: The first node sends the service switching message on the first protection path.

For example, the first node sends, on the first protection path, the first data frame that carries the service switching message.

In this embodiment, because a cross-connection of the first protection path is already established, the first node may directly send the first OSU frame on the first protection path.

This step further includes the following. The first node maps the first OSU frame to a higher order OTN frame, for example, an ODUk frame, and then sends the OTN frame on the first protection path.

For example, the first node switches the first service to the first protection path only after sending the first data frame to the downstream node on the first protection path. In this way, the first data frame is sent first and then the service is switched. On the one hand, it is ensured that the first data frame can be sent smoothly. This is because if the protection group is switched first, a service data flow is transmitted in this case because the downstream node has not completed bandwidth adjustment, but a bandwidth of the service data flow is usually much greater than the guard bandwidth, resulting in difficulty in sending the first data frame. On the other hand, it can be ensured that the first data frame is quickly transmitted to a peer node to perform end-to-end protection switching, thereby quickly restoring the service.

S840: The first node switches a current working route to a working route corresponding to the first protection path.

Because switching of an L3 service is performed, the first node further needs to perform route switching in addition to path switching.

For example, the first node determines, based on the service ID of the affected service, a protection path of the service, and then determines a routing protection group corresponding to the first protection path based on a correspondence between a protection path and a routing protection group. The routing protection group includes a primary route and a secondary route. The primary route is a current working route of the first node, that is, a working route used when the first node transmits the L3 service on the first working path. The secondary route is a working route used when the first node transmits the L3 service on the first protection path. Finally, the first node switches the working route from the current working route (namely, the primary route) to the secondary route.

S850: The first node adjusts the bandwidth of the service from the guard bandwidth to the target bandwidth, and switches the service to the first protection path.

For example, the first node adjusts the bandwidth of the service from the guard bandwidth to the target bandwidth, and switches the service to the first protection path.

It can be learned that, based on the service protection method provided in the foregoing embodiment, the virtual connection of the shared protection path is established in an end-to-end manner in advance before a fault occurs in the service, and when a fault occurs on the working path of the service, the head node forwards, on the protection path at the layer L1 in an end-to-end manner, the OSU frame that carries control signaling, switches the L3 service to the protection path through a protection switching mechanism of the head node and the last node and in combination with the OSU frame, and switches an L3 route on the head node and the last node, so that the protection path of the service takes effect quickly, thereby quickly restoring the performance of the L3 service. According to the foregoing method, the virtual connection of the protection path is established in advance for a plurality of services, and a bandwidth of a protection path section is shared. In this way, on the one hand, a bandwidth resource can be saved, on the other hand, a switching speed can be increased, so that performance of the L3 service can be quickly restored.

Figure 9:
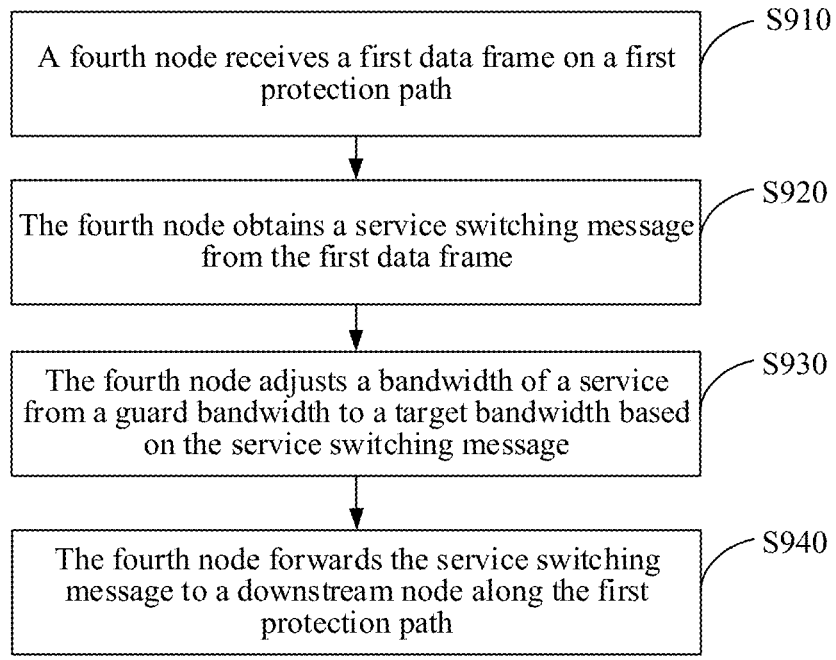
FIG. 9 is a schematic flowchart of another service protection method according to an embodiment of this application.

FIG. 9 is a flowchart of another service protection method according to an embodiment of this application. The method may be applied to the fifth node in FIG. 7. An example in which an execution body is the fifth node (that is, the fourth node in this application) in FIG. 7 is used for description.

S910: The fourth node receives a first data frame on a first protection path.

The following uses an example in which the first data frame is a first OSU frame for description.

For example, the fourth node receives the first OSU frame from a first node, where the first OSU frame carries a service switching message.

Further, the first OSU frame may be mapped to an advanced data frame, for example, an OTN frame. In this case, the fourth node receives the OTN frame (for example, an ODUk frame) from the first node, and demaps the OTN frame to obtain the OSU frame.

S920: The fourth node obtains the service switching message from the first data frame.

The fourth node only needs to activate and adjust a bandwidth. Therefore, after receiving the OSU frame, the fourth node obtains a bandwidth activation message in the service switching message from a payload area of the first OSU frame. The bandwidth activation message is located in the payload area of the first OSU frame, and occupies four bytes, that is, 32 bits in total.

In addition, the first OSU frame may further carry an APS type message and an APS message. The APS type message indicates a last node on the first protection path to switch a working route, and occupies two bytes, that is, 16 bits in total. The APS message indicates the last node on the first protection path to switch a service to the first protection path. The APS message is also located in the payload area and occupies two bytes, that is, 16 bits in total. Because the fourth node only needs to adjust the bandwidth, the APS type message and the APS message are only transparently transmitted at the fourth node, and the APS type message and the APS message do not need to be parsed.

For example, the first OSU frame further includes at least one of the following information: a protocol packet length, a message type, a version number, and a protection path service ID, where the message type indicates a type of a message carried in the OSU frame. The protection path service ID indicates the fourth node to determine whether another service shares a bandwidth resource with the service.

S930: The fourth node adjusts the bandwidth of the service from a guard bandwidth to a target bandwidth based on the service switching message.

For example, the bandwidth activation message includes the target bandwidth of the service, and the fourth node adjusts the bandwidth of the service from the guard bandwidth to the target bandwidth based on the bandwidth activation message, where the guard bandwidth is represented by a bandwidth occupied by a virtual connection of the first protection path.

S940: The fourth node forwards the service switching message to a downstream node along the first protection path.

For example, the fourth node forwards the first OSU frame that carries the service switching message to the downstream node along the first protection path. For example, the fourth node forwards the first OSU frame to a third node along the first protection path.

Figure 10:
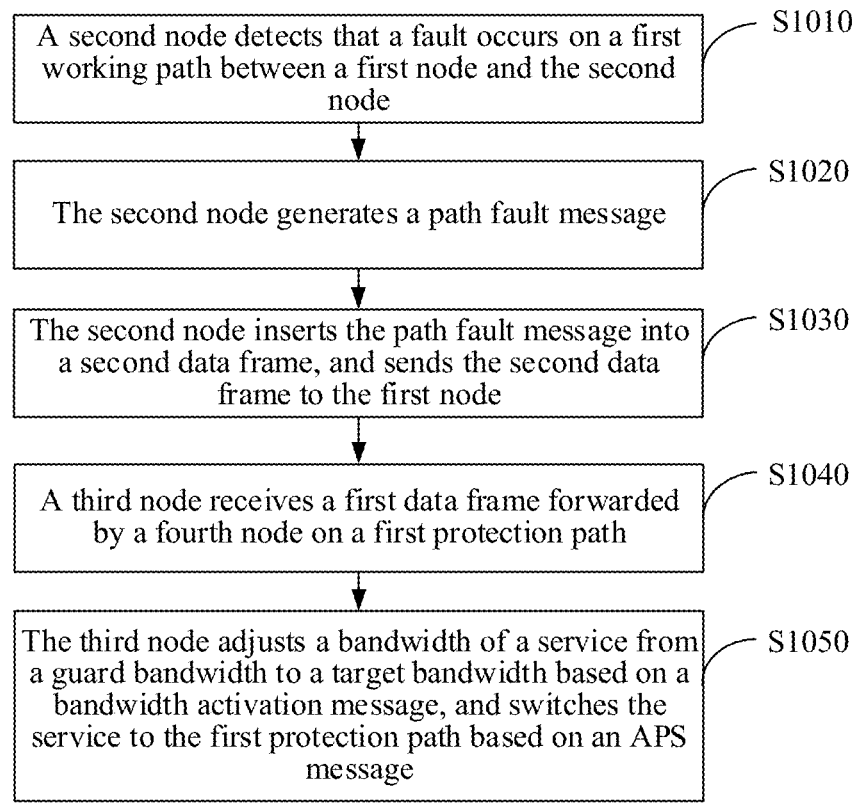
FIG. 10 is a schematic flowchart of still another service protection method according to an embodiment of this application.

FIG. 10 is a flowchart of still another service protection method according to an embodiment of this application. The method may be applied to the first sink node (namely, a third node in this application) shown in FIG. 7. The following uses an example in which an execution body is the third node for description.

S1010: A second node detects that a fault occurs on a first working path between a first node and the second node.

In a normal state, the second node may receive service data from the first node. When a fault occurs on the working path between the first node and the second node, the second node cannot receive the service data from the first node within a specific period of time, or receive damaged data (for example, a packet loss or a bit error) from the first node. In this case, the second node determines that a fault occurs on the first working path. The fault includes a fault that occurs on a link between the first node and the second node, for example, a fiber break, may further include a fault that occurs on a transmit port of the first node, or a fault that occurs on a receive port of the second node, or may further include another type of fault.

S1020: The second node generates a path fault message.

The path fault message indicates that a fault occurs on the first working path between the first node and the second node.

The path fault message in this embodiment may be an RSVP notify message. The RSVP notify message is a path event notification message. For an example format thereof, refer to an existing notify message. The path fault message may carry an ID of an affected service, fault point information, and the like.

S1030: The second node inserts the path fault message into a second data frame, and sends the second data frame to the first node.

For example, the second data frame may be a second OSU frame. In this case, the second node inserts the path fault message into an overhead of the second OSU frame, and sends the second OSU frame to the first node. After receiving the second OSU frame, the first node may determine that a fault occurs on the first working path between the first node and the second node, generate the service switching message based on the fault on the first working path, and insert the service switching message into a first OSU frame, and sends the first OSU frame to the fourth node on the first protection path.

It should be noted that, step S1010 to step S1030 are optional steps. Actually, the first node may also sense that a fault occurs on the working path of the service by itself.

S1040: The third node receives a first data frame forwarded by the fourth node on the first protection path.

For example, the first data frame may be the first OSU frame.

The first data frame carries at least bandwidth activation information. The bandwidth activation information indicates the third node to adjust a bandwidth of the first protection path from a guard bandwidth to a target bandwidth. The bandwidth activation message is carried in a payload area of the first OSU frame.

For example, when the third node and the second node are a same node, that is, when the third node is a real sink node of the first protection path, the first OSU frame may further include an APS type message and an APS message. The APS type message indicates the third node to switch a working route, and the APS message indicates the third node to switch the service from the first working path to the first protection path. The APS type message and the APS message are carried in a payload area of the first OSU frame.

S1050: The third node adjusts a bandwidth of the service from the guard bandwidth to the target bandwidth based on the bandwidth activation message, and switches the service to the first protection path based on the APS message.

For example, the third node obtains the bandwidth activation message from the payload area of the first OSU frame, and adjusts the bandwidth of the service from the guard bandwidth to the target bandwidth based on the bandwidth activation information.

For example, when the third node and the second node are a same node, the third node may further obtain the APS type message and the APS message from the payload area of the first OSU frame. In this case, the third node may switch, based on the APS type message, a working route from a current working route (namely, a primary route) to a route (namely, the secondary route) corresponding to the first protection path.

Further, because the third node receives the first OSU frame on the first protection path, the third node may directly determine, based on the first protection path and a preconfigured correspondence between a path and a routing protection group, a routing protection group corresponding to the first protection path. The routing protection group includes the primary route and the secondary route.

Then, after switching the working route to the secondary route and adjusting the bandwidth of the first protection path to the target bandwidth, the third node may switch the service to the first protection path based on the APS message.

It should be noted that, when the first node, the third node, and the fourth node adjust the bandwidth of the first protection path from the guard bandwidth to the target bandwidth, if a node A is not a node on a shared protection path section, whether a current remaining bandwidth is greater than the target bandwidth of the service is determined, and if yes, the node A directly activates a guard bandwidth of an ingress/egress channel corresponding to a service of the current node to the target bandwidth, or if no, the node A sends activation failure information to the first node or does not perform processing, where the node A is any one of the first node, the third node, and the fourth node.

If the node A is a node on the shared protection path section, bandwidth adjustment needs to be performed in the following manner.

When determining that the current remaining bandwidth is greater than the target bandwidth of the service, the node A directly activates the guard bandwidth of the ingress/egress channel corresponding to the service of the current node to the target bandwidth.

When determining that the current remaining bandwidth is less than the target bandwidth of the service, the node A obtains, based on a virtual connection service ID of the service, a service group ID that shares the bandwidth of the protection path section, and further obtains IDs of N associated services that share the bandwidth with the service. In this case, if a sum of the remaining bandwidth and guard bandwidths of the N+1 services is greater than the target bandwidth of the service, the third node adjusts the guard bandwidths of the associated services to zero, and then adjusts the bandwidth of the service from the guard bandwidth to the target bandwidth. For example, guard bandwidths of the service and other three associated services (where N=3) on the protection path section are all 2 M, the target bandwidth of the service is 100 M, and a remaining bandwidth of the fourth node is 92 M. The fourth node learns, through calculation, that the sum of the remaining bandwidth and the guard bandwidths of the N+1 services is 92 M+2 M*(3+1) greater than the target bandwidth of the service, then adjusts the guard bandwidths of the associated services to 0, and then adjusts the bandwidth of the service to the target bandwidth.

It should be noted that, when the sum of the remaining bandwidth and the guard bandwidths of the N+1 services is greater than the target bandwidth of the service, the node A may select some of the associated services, adjust the guard bandwidths thereof to 0, or adjust the bandwidths of all the associated services to 0, and then adjust the bandwidth of the service to the target bandwidth. A specific processing manner is not limited in this embodiment of this application.

It should be further noted that, when the sum of the remaining bandwidth and the guard bandwidths of the N+1 services is less than the target bandwidth of the service, the node A does not perform processing, or the fourth node sends the activation failure information to the first node.

The following describes service protection in this application by using two actual scenarios as an example with reference to the accompanying drawings.

Figure 11:
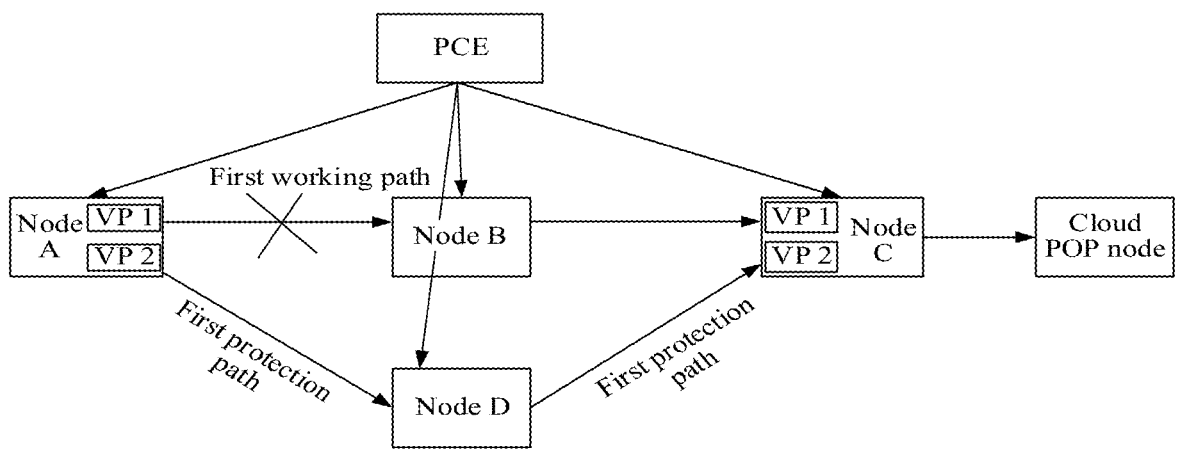
FIG. 11 is a schematic diagram of point-to-point service restoration according to an embodiment of this application.

Scenario 1: Point-to-Point Scenario:

Referring to FIG. 11, a first working path is: node A→node B→node C, and a first protection path is: node A→node D→node C. This scenario is the point-to-point scenario, that is, a scenario from the node A to the node C, and is also a scenario in which the second node (the node C)

and the third node (the node C) are a same node. Therefore, a network device first configures a service protection group (a shared protection group and a routing protection group) on the node A and the node C. Further, a protection path of a service is configured to node A→node B→node C, and the routing protection group is: primary route: destination: a cloud gateway address, a next-hop node C-an egress VP 1-the first working path (a primary liquid OTN trail), secondary route: destination: a cloud gateway address, a next-hop node C-an egress VP 2-the first protection path (a secondary liquid OTN trail). When a fault occurs on the first working path, for example, when a fiber break occurs between the node A and the node B, the node A may receive a fault message sent by the node C, determine that a fault occurs on the first working path, and then generate a service switching message based on that a fault occurs on the first working path. In the point-to-point scenario, the service switching message needs to include a bandwidth activation message, an APS type message, and an APS message, and the bandwidth activation message, the APS type message, and the APS message are inserted into a payload area of a first OSU frame. The first node sends the first OSU frame on the first protection path, then switches a working route from the primary route to the secondary route, adjusts a bandwidth of the first protection path from a guard bandwidth to a target bandwidth, and switches the service from the first working path to the first protection path. After receiving the first OSU frame, the node B may perform bandwidth activation based on the bandwidth activation message in the first OSU frame, and adjust the bandwidth of the first protection path from the guard bandwidth to the target bandwidth. Then, the node B forwards the first OSU frame to the node C, and the node C parses the first OSU frame to obtain the bandwidth activation message, the APS type message, and the APS message. Finally, the node C adjusts the bandwidth of the first protection path from the guard bandwidth to the target bandwidth based on the bandwidth activation message, adjusts a current working route from the primary route to the secondary route, and switches the service from the first working path to the first protection path.

Scenario 2: Point-to-Multipoint Scenario or an Open-End Scenario)

Figure 12:
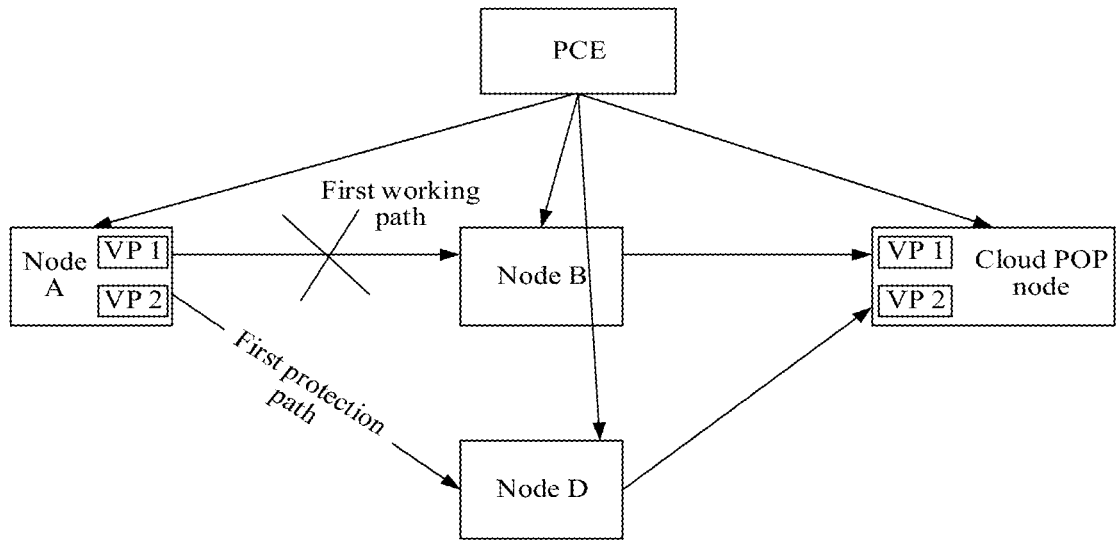
FIG. 12 is a schematic diagram of point-to-multipoint service restoration according to an embodiment of this application.

Referring to FIG. 12, a first working path is: node A→node B, and a first protection path is: node A→node D. This scenario is the point-to-multipoint scenario, that is, a scenario in which sink nodes corresponding to the node A are the node B and the node D respectively, and is also a scenario in which the second node (the node B) and the third node (the node D) are not a same node. Therefore, the network device needs to configure a service protection group (a shared protection group and a routing protection group) only on the node A, and does not need to configure a service protection group on the node D. The case that a service protection group needs to be configured on a cloud POP node, and the cloud POP node completes switching of an L3 service is not content concerned in this application, and is not excessively described.

Further, a protection path of a service is configured to node A→node B, and the routing protection group is: primary route: destination: a cloud gateway address, a next-hop cloud POP node-an egress VP 1-the first working path (a primary liquid OTN trail), secondary route: destination: a cloud gateway address, a next-hop cloud POP node-an egress VP 2-the first protection path (a secondary liquid OTN trail). When a fault occurs on the first working path, for example, when a fiber break occurs between the node A and the node B, the node A may receive a fault message sent by the node B, determine that a fault occurs on the first working path, and then generate a service switching message based on that a fault occurs on the first working path. In the point-to-multipoint scenario, the service switching message needs to include only a bandwidth activation message, and does not need to carry an APS type message and an APS message. Then, the bandwidth activation message is inserted into a payload area of a first OSU frame. The first node sends the first OSU frame on the first protection path, then switches a working route from the primary route to the secondary route, adjusts an occupied bandwidth of the first protection path from a guard bandwidth to a target bandwidth, and switches the service from the first working path to the first protection path. In this case, after receiving the first OSU frame, the node D only needs to perform bandwidth activation based on the bandwidth activation message in the first OSU frame, and adjust the bandwidth of the first protection path from the guard bandwidth to the target bandwidth.

The following describes differences and common points between switching of the L3 service and switching of the layer L1 service in this application. Table 4 shows differences and common points between switching of an L3 service and switching of a layer L1 service.

TABLE 4

| | L3 service (IP FRR + OSU channel associated signaling) | Layer L1 service (liquid OTN shared protection) |
|---|---|---|
| Service SLA configuration | L3 service level agreement (Service Level Agreement, SLA); an attribute is embodied at both an L3 and a layer L1, and an SLA attribute needs to be sensed for configuration of both services of the two layers. | Layer L1 SLA; an attribute is embodied only on the layer L1 service and configuration is also embodied only on the layer L1 service. |
| OSU service model | Applicable to both an OSU tunnel and an OSU trail | OSU trail |
| Protection group | A layer 3 routing protection group is configured on a head node and a last node, an attribute of a secondary route is a layer 3 virtual connection protection type, and an identifier associated network layer is a liquid OTN tunnel virtual connection. | An attribute is of a shared protection type, and the attribute is embodied only at the layer L1 and has no network layer identifier. |
| Multi-layer association & switching | A layer 3 fault is detected, and layer 3 switching associatively triggers layer L1 bandwidth activation processing; or a layer L1 fault is reversely associated with the L3 to switch a route, and then trigger layer L1 bandwidth activation processing. | There are only single-layer switching and single-layer bandwidth activation, and there is no association with the L3. |
| Data plane | The head node and the last node transmit the L3 service through routing and forwarding, and the data plane is at the L3; an intermediate node transmits the L3 service through liquid OTN circuit switching. | The head node, the last node, and the intermediate node each transmit the layer L1 service through liquid OTN circuit switching. |
| OSU channel associated signaling | The service is restored by using a bandwidth activation message + an APS type + APS in an end-to-end manner, the APS type indicates APS, and APS is layer 3 service protection switching, but not layer 1 service protection switching, and transmission is performed by using an OSU frame at the layer L1. | End-to-end restoration is performed by using a bandwidth activation message + APS, the APS indicates service switching at the layer L1, and transmission is also performed at the layer L1. |
| Fault detection mode | Liquid OTN fault detection | Liquid OTN fault detection |

In the embodiments for implementing rerouting provided in this application, the service protection method provided in the embodiments of this application is separately described from a perspective of interaction between the first node, the second node, the third node, and the fourth node, and the first node, the second node, the third node, and the fourth node. To implement functions in the methods provided in the embodiments of this application, the first node, the second node, the third node, and the fourth node may include a hardware structure and/or a software module, and implement the foregoing functions in a form of a hardware structure, a software module, or a hardware structure plus a software module. Whether a specific function in the foregoing functions is performed by the hardware structure, the software module, or a combination of the hardware structure and the software module depends on a specific application and design constraint conditions of the technical solutions.

Figure 13:
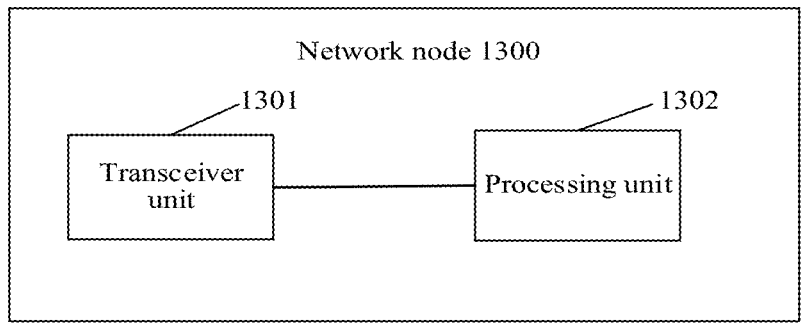
FIG. 13 is a schematic diagram of a structure of a network node according to an embodiment of this application.

FIG. 13 is a schematic diagram of a structure of a network node according to an embodiment of this application. A network node 1300 can implement a function of the first node or the second node in the foregoing method embodiments, and therefore can further implement beneficial effects of the foregoing method embodiments. In this embodiment of this application, the communication apparatus may be the first node and the third node shown in the foregoing method embodiments, may be the fourth node, or may be a module (such as a chip) applied to the first node, the third node, and the fourth node.

As shown in FIG. 13, the network node 1300 includes a transceiver unit 1301 and a processing unit 1302. The network node 1300 may be configured to implement the function of the first node, the third node, or the fourth node in the foregoing method embodiments.

When the network node 1300 is configured to implement the function of the first node in the foregoing method embodiments.

The processing unit 1302 is configured to determine that a fault occurs on a first working path, and generate a service switching message based on that a fault occurs on the first working path.

The transceiver unit 1301 is configured to send the service switching message on a first protection path, where the service switching message indicates to adjust a bandwidth of a service from a guard bandwidth to a target bandwidth, the guard bandwidth represents a pre-occupied bandwidth of the first protection path before the service is transmitted, and the target bandwidth represents an actually occupied bandwidth for transmitting the service on the first protection path, where the guard bandwidth is less than the target bandwidth. The processing unit is further configured to switch a current working route to a working route corresponding to the first protection path.

When the network node 1300 is configured to implement the function of the third node in the foregoing method embodiments.

The transceiver unit 1301 is configured to receive a first data frame on a first protection path.

The processing unit 1302 is configured to obtain a service switching message from the first data frame, where the service switching message indicates the third node to adjust a bandwidth of a service from a guard bandwidth to a target bandwidth, the guard bandwidth represents a pre-occupied bandwidth of the first protection path before the service is transmitted, and the target bandwidth represents an actually occupied bandwidth for transmitting the service on the first protection path, where the guard bandwidth is less than the target bandwidth, and adjust the bandwidth of the service from the guard bandwidth to the target bandwidth based on the service switching message.

When the network node 1300 is configured to implement the function of the fourth node in the foregoing method embodiments.

The transceiver unit 1301 is configured to receive a first data frame on a first protection path.

The processing unit 1302 is configured to obtain a service switching message from the first data frame, where the service switching message indicates the network node to adjust a bandwidth of a service from a guard bandwidth to a target bandwidth, the guard bandwidth represents a pre-occupied bandwidth of the first protection path before the service is transmitted, and the target bandwidth represents an actually occupied bandwidth for transmitting the service on the first protection path, where the guard bandwidth is less than the target bandwidth, and adjust the bandwidth of the service from the guard bandwidth to the target bandwidth based on the service switching message.

For more detailed function descriptions of the transceiver unit 1301 and the processing unit 1302, refer to related descriptions in the foregoing method embodiments. Details are not described herein again.

Figure 14:
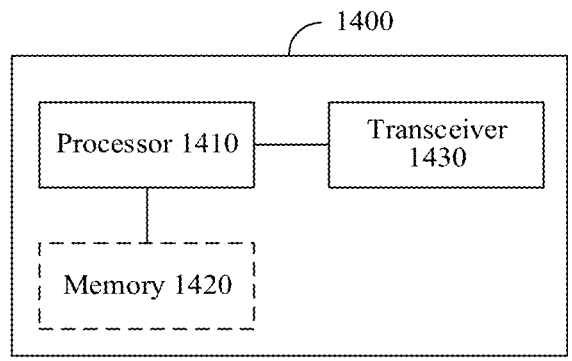
FIG. 14 is a schematic diagram of a structure of a communication device according to an embodiment of this application.

FIG. 14 is a schematic diagram of a structure of a communication device according to an embodiment of this application. The communication device 1400 includes a processor 1410, and the processor 1410 is coupled to a memory 1420. The memory 1420 may be configured to store a computer program or instructions and/or data. The processor 1410 is configured to execute the computer program or the instructions and/or the data stored in the memory 1420, so that the service protection method in the foregoing method embodiments is performed.

As shown in FIG. 14, the communication device 1400 further includes a transceiver 1430. The transceiver 1430 is configured to receive and/or send a signal. For example, the processor 1410 is configured to control the transceiver 1430 to receive and/or send a signal.

Optionally, the communication device 400 includes one or more processors 1410.

Optionally, as shown in FIG. 14, the communication device 1400 further includes the memory 1420.

Optionally, the communication device 1400 may include one or more memories 1420.

Optionally, the memory 1420 and the processor 1410 may be integrated together, or disposed separately.

For example, the processor 1410 is configured to implement a related operation performed by the processing unit 1302 in the foregoing embodiments, and the transceiver 1430 is configured to implement a related operation performed by the transceiver unit 1301 in the foregoing embodiments.

An embodiment of this application further provides a computer-readable storage medium. The computer-readable storage medium stores a computer program. When the program is executed by a processor, a procedure related to the first node, a procedure related to the third node, or a procedure related to the fourth node in the service protection method provided in the foregoing method embodiments may be performed.

An embodiment of this application further provides a computer program product. When the computer program product runs on a computer or a processor, the computer or the processor is enabled to perform one or more steps in any one of the foregoing service protection methods. If each of component modules of the foregoing device is implemented in a form of a software functional unit and is sold or used as an independent product, the component modules may be stored in a computer-readable storage medium.

It may be understood that, the processor in the embodiments of this application may be a central processing unit (CPU), or may be another general-purpose processor, a digital signal processor (DSP), an application-specific integrated circuit (ASIC), a field-programmable gate array (FPGA) or another programmable logic device, a transistor logic device, a hardware component, or any combination thereof. The general-purpose processor may be a microprocessor, or may be any conventional processor.

The method steps in the embodiments of this application may be implemented in a hardware manner or may be implemented in a manner of executing software instructions by a processor. The software instructions may include a corresponding software module. The software module may be stored in a random-access memory (RAM), a flash memory, a read-only memory (ROM), a programmable ROM (PROM), an erasable PROM (EPROM), an electrically EPROM (EEPROM), a register, a hard disk, a removable hard disk, a compact-disc (CD) ROM (CD-ROM), or any other form of storage medium well-known in the art. For example, a storage medium is coupled to a processor, so that the processor can read information from the storage medium or write information into the storage medium. Certainly, the storage medium may be a component of the processor. The processor and the storage medium may be located in an ASIC. In addition, the ASIC may be located in the first node, the third node, or the fourth node. Certainly, the processor and the storage medium may alternatively exist as discrete components in the first node, the third node, or the fourth node.

All or a part of the foregoing embodiments may be implemented by software, hardware, firmware, or any combination thereof. When software is used to implement the embodiments, all or a part of the embodiments may be implemented in a form of a computer program product. The computer program product includes one or more computer programs or instructions. When the computer programs or the instructions are loaded and executed on a computer, all or some of the procedures or functions in the embodiments of this application are performed. The computer may be a general-purpose computer, a dedicated computer, a computer network, or another programmable apparatus. The computer programs or instructions may be stored in a computer-readable storage medium, or transmitted by using the computer-readable storage medium. The computer-readable storage medium may be any usable medium accessible to a computer, or a data storage device such as a server integrating one or more usable media. The usable medium may be a magnetic medium, for example, a floppy disk, a hard disk, or a magnetic tape, may be an optical medium, for example, a DIGITAL VERSATILE DISC (DVD), or may be a semiconductor medium, for example, a solid-state drive (SSD).

In the embodiments of this application, unless otherwise stated or there is a logic conflict, terms and/or descriptions in different embodiments are consistent and may be mutually referenced, and technical features in different embodiments may be combined based on an internal logical relationship thereof, to form a new embodiment.

In this application, "at least one" means one or more, and "a plurality of" means two or more. The term "and/or" is an association relationship for describing associated objects and represents that three relationships may exist. For example, A and/or B may represent the following three cases: only A exists, both A and B exist, and only B exists, where A and B may be singular or plural.

It may be understood that numerical symbols involved in the embodiments of this application are differentiated merely for ease of description, but are not used to limit the scope of the embodiments of this application. The sequence numbers of the foregoing processes do not mean the execution sequence, and the execution sequence of the processes should be determined according to their functions and internal logic.

The foregoing descriptions are merely examples of specific embodiments of this application, but are not intended to limit the protection scope of this application. Any variation or replacement readily figured out by a person skilled in the art within the technical scope disclosed in this application shall fall within the protection scope of this application. Therefore, the protection scope of this application should be subject to the protection scope of the claims.

What is claimed is:

1. A method implemented by a first node of a communication system, wherein the method comprises:
   determining that a fault has occurred on a first working path, wherein the first node is a common head node of the first working path, wherein the first working path is a current communication path of a service, wherein the service is a layer 3 (L3) service;
   generating, in response to determining that the fault has occurred on the first working path, a service switching message instructing to adjust a bandwidth of the service from a guard bandwidth to a target bandwidth, wherein the guard bandwidth represents a pre-occupied bandwidth of a first protection path before the service is transmitted, wherein the target bandwidth represents an actually occupied bandwidth for transmitting the service on the first protection path, wherein the guard bandwidth is less than the target bandwidth, wherein the first node is the common head node of the first protection path, and wherein the first protection path is a backup path of the first working path;
   determining, based on the first protection path and a correspondence between the first protection path and routing protection groups, a first routing protection group, wherein the correspondence is preconfigured on the first node and a sink node of the first working path, wherein the first routing protection group comprises a primary route and a secondary route, wherein the primary route is for use when the first node transmits the service on the first working path, and wherein the secondary route is for use when the first node transmits the service on the first protection path;
   sending, on the first protection path, the service switching message to a second node; and
   switching from the primary route to the secondary route.

2. The method of claim 1, wherein the service switching message further instructs the second node or a third node to switch a current working route when the second node and the third node are a same node.

3. The method of claim 2, wherein the service switching message comprises an automatic protection switching (APS) type message instructing the second node or the third node to switch the primary route.

4. The method of claim 1, further comprising:
   inserting, into a payload area of a first data frame, the service switching message; and
   sending, on the first protection path, the first data frame.

5. The method of claim 4, wherein the payload area comprises a plurality of optical service units, wherein each of the optical service units comprises a unit overhead area and a unit payload area, and wherein the method further comprises inserting, into the unit payload area of one or more of the optical service units, the service switching message.

6. The method of claim 1, wherein after sending the service switching message, the method further comprises:
receiving a bandwidth activation message in the service switching message;
adjusting the bandwidth from the guard bandwidth to the target bandwidth based on the bandwidth activation message; and
switching the service to the first protection path.

7. The method of claim 1, wherein the method further comprises:
obtaining a service identifier (ID) of the service; and
determining, based on the service ID, the first protection path.

8. A service protection method implemented by a third node of a communication system, wherein the service protection method comprises:
receiving a first data frame on a first protection path, wherein the third node is a sink node of the first protection path, wherein the first protection path is a backup path of a first working path of a service, and wherein the service is a layer 3 (L3) service;
obtaining, from the first data frame, a service switching message instructing the third node to adjust a bandwidth of the service from a guard bandwidth to a target bandwidth, wherein the guard bandwidth represents a pre-occupied bandwidth of the first protection path before the service is transmitted, wherein the target bandwidth represents an occupied bandwidth for transmitting the service on the first protection path, and wherein the guard bandwidth is less than the target bandwidth;
determining, based on the first protection path and a correspondence between the first protection path and routing protection groups, a first routing protection group, wherein the correspondence is preconfigured on the third node and a common head node of the first working path, wherein the first routing protection group comprises a primary route and a secondary route, wherein the primary route is for transmitting the service on the first working path, and wherein the secondary route is for transmitting the service on the first protection path; and
adjusting, based on the service switching message, the bandwidth from the guard bandwidth to the target bandwidth and switching the service to a working route corresponding to the first protection path.

9. The service protection method of claim 8, wherein the service switching message further instructs the third node to switch the working route, and wherein the service protection method further comprises switching the working route from the primary route to the secondary route.

10. The service protection method of claim 9, wherein the service switching message comprises an automatic protection switching (APS) type message instructing the third node to switch the working route.

11. The service protection method of claim 8, wherein the first data frame comprises a payload area, and wherein the service switching message is carried in the payload area.

12. The service protection method of claim 11, wherein the payload area comprises a plurality of optical service units, wherein each of the optical service units comprises a unit overhead area and a unit payload area, and wherein the service switching message is carried in the unit payload area of one or more of the optical service units.

13. The service protection method of claim 8, further comprising:
obtaining a bandwidth activation message in the service switching message; and
adjusting the bandwidth from the guard bandwidth to the target bandwidth based on the bandwidth activation message.

14. A communication device comprising:
a memory configured to store instructions; and
one or more processors coupled to the memory and configured to execute the instructions to cause the communication device to:
determine that a fault has occurred on a first working path of a layer 3 (L3) service, wherein the communication device is a common head node of the first working path, wherein the first working path is a current communication path of the L3 service;
generate, in response to determining that the fault has occurred on the first working path, a service switching message instructing to adjust a bandwidth of the L3 service from a guard bandwidth to a target bandwidth, wherein the guard bandwidth represents a pre-occupied bandwidth of a first protection path before the L3 service is transmitted, wherein the target bandwidth represents an actually occupied bandwidth for transmitting the L3 service on the first protection path, wherein the guard bandwidth is less than the target bandwidth, wherein the communication device is the common head node of the first protection path, and wherein the first protection path is a backup path of the first working path;
determine, based on the first protection path and a correspondence between the first protection path and routing protection groups, a first routing protection group, wherein the correspondence is preconfigured on the communication device and a sink node of the first working path, wherein the first routing protection group comprises a primary route and a secondary route, wherein the primary route is for use when the communication device transmits the service on the first working path, and wherein the secondary route is for use when the communication device transmits the service on the first protection path;
send, on the first protection path, the service switching message to a second node; and
switch from the primary route to the secondary route.

15. The communication device of claim 14, wherein the service switching message comprises an automatic protection switching (APS) type message instructing another communication device to switch the primary route.

16. The communication device of claim 14, wherein the instructions, when executed by the one or more processors, cause the communication device to:
insert, into a payload area of a first data frame, the service switching message; and
send, on the first protection path, the first data frame.

17. The communication device of claim 16, wherein the payload area comprises a plurality of optical service units, wherein each of the optical service units comprises a unit overhead area and a unit payload area, and wherein before sending the first data frame, the instructions, when executed by the one or more processors, further cause the communication device to insert, into the unit payload area of one or more of the optical service units, the service switching message.

18. The communication device of claim 14, wherein after sending the service switching message, the instructions, when executed by the one or more processors, further cause the communication device to:
  receive a bandwidth activation message in the service switching message;
  adjust the bandwidth from the guard bandwidth to the target bandwidth based on the bandwidth activation message; and
  switch the service to the first protection path.

19. The communication device of claim 14, wherein before sending the service switching message, the instructions, when executed by the one or more processors, further cause the communication device to:
  obtain a service identifier (ID) of the L3 service; and
  determine, based on the service ID, the first protection path.

20. The communication device of claim 14, wherein the service switching message further instructs the second node or a third node to switch the primary route when the second node and the third node are a same node.

\* \* \* \* \*